United States Patent
Kawamoto et al.

(10) Patent No.: US 10,994,208 B2
(45) Date of Patent: May 4, 2021

(54) INFORMATION PROCESSING SYSTEM, STORAGE MEDIUM STORING INFORMATION PROCESSING PROGRAM, AND INFORMATION PROCESSING METHOD

(71) Applicant: NINTENDO CO., LTD., Kyoto (JP)

(72) Inventors: Koichi Kawamoto, Kyoto (JP); Shinji Kitahara, Kyoto (JP); Naoya Yamamoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 5 days.

(21) Appl. No.: 16/752,901

(22) Filed: Jan. 27, 2020

(65) Prior Publication Data

US 2021/0060436 A1    Mar. 4, 2021

(30) Foreign Application Priority Data

Aug. 30, 2019   (JP) .............................. JP2019-158044

(51) Int. Cl.
    *A63F 13/67*       (2014.01)
    *A63F 13/213*     (2014.01)

(52) U.S. Cl.
    CPC ............ *A63F 13/67* (2014.09); *A63F 13/213* (2014.09)

(58) Field of Classification Search
    None
    See application file for complete search history.

(56) References Cited

U.S. PATENT DOCUMENTS 5,342,273 A *   8/1994   Plendl .................... A63B 19/00
                                                                      482/122
6,932,747 B2 *   8/2005   Herman ............... A63B 21/026
                                                                          482/121

(Continued)

FOREIGN PATENT DOCUMENTS

| GB | 2 455 139 | 6/2009 |
| JP | 2005-103104 | 4/2005 |

(Continued)

OTHER PUBLICATIONS

Extended European Search Report dated Jan. 14, 2021 in corresponding European Application No. 20192210.1, 7 pages.

(Continued)

*Primary Examiner* — Seng H Lim
(74) *Attorney, Agent, or Firm* — Nixon & Vanderhye PC

(57) ABSTRACT

An example of an information processing system includes a training apparatus and an information processing apparatus. The information processing apparatus executes a game. The training apparatus includes a sensor and a processor. The sensor detects a load applied on the training apparatus. The processor transmits information relating to the load detected by the sensor as first information to the information processing apparatus while the game is executed. The processor stores information relating to the load detected by the sensor as second information in a storage device integral with or separate from the training apparatus while the game is not executed. The information processing apparatus progresses the game based on the first information received from the training apparatus, and gives a reward that has an influence on the progress of the game to a user of the game based on the second information obtained from the storage device.

12 Claims, 18 Drawing Sheets

(56) References Cited

U.S. PATENT DOCUMENTS

| | | | |
|---|---|---|---|
| 10,471,303 B2* | 11/2019 | Kuroda | A63B 71/0622 |
| 10,751,613 B1* | 8/2020 | Tamura | A63F 13/98 |
| 10,870,047 B1* | 12/2020 | Kawamoto | A63B 71/0622 |
| 10,881,909 B2* | 1/2021 | Kuroda | A63B 71/0622 |
| 10,918,898 B1* | 2/2021 | Palacios | A63B 23/03516 |
| 2006/0260395 A1* | 11/2006 | Feldman | A63B 71/0622 |
| | | | 73/379.01 |
| 2008/0146336 A1* | 6/2008 | Feldman | A63F 13/24 |
| | | | 463/37 |
| 2009/0093305 A1* | 4/2009 | Okamoto | A63F 13/95 |
| | | | 463/36 |
| 2009/0094442 A1* | 4/2009 | Okamoto | A63F 13/42 |
| | | | 712/225 |
| 2010/0004061 A1* | 1/2010 | Merril | A63B 24/0087 |
| | | | 463/36 |
| 2010/0069148 A1 | 3/2010 | Cargill et al. | |
| 2010/0137063 A1* | 6/2010 | Shirakawa | A63F 13/42 |
| | | | 463/31 |
| 2010/0169110 A1* | 7/2010 | Sawano | G06Q 10/10 |
| | | | 705/2 |
| 2010/0245236 A1* | 9/2010 | Takayama | A63F 13/803 |
| | | | 345/156 |
| 2011/0077088 A1* | 3/2011 | Hayashi | A63F 13/218 |
| | | | 463/43 |
| 2012/0129653 A1* | 5/2012 | Shalev | A61H 23/0263 |
| | | | 482/1 |
| 2013/0157817 A1* | 6/2013 | Green | A63B 23/1209 |
| | | | 482/122 |
| 2014/0244722 A1* | 8/2014 | Hayashi | H04L 67/06 |
| | | | 709/203 |
| 2016/0367857 A1 | 12/2016 | Aragones et al. | |
| 2017/0216670 A1* | 8/2017 | Kuroda | A63F 13/24 |
| 2021/0060423 A1* | 3/2021 | Kitahara | A63F 13/42 |
| 2021/0060436 A1* | 3/2021 | Kawamoto | A63F 13/218 |

FOREIGN PATENT DOCUMENTS

| | | |
|---|---|---|
| JP | 6210997 | 9/2017 |
| WO | 2016/059943 | 4/2016 |

OTHER PUBLICATIONS

Notice of Reasons for Refusal dated Jun. 15, 2020 in corresponding Japanese Application No. 2019-158044, 5 pages.

Office Action dated Jan. 10, 2020 issued in Japanese Application No. 2019-158044 (4 pgs.) and translation (5 pgs.).

About the oriori ball, FOX, Dec. 17, 2018, [online] [searched on Dec. 23, 2019] URL, https://foxinc.jp/pr/2268/ (7 pgs.).

* cited by examiner

Fig.13

| BONUS | |
|---|---|
| XP | 87 exp |
| MONEY | 50 |
| MATERIALS | ○○ : 3 |
| ITEMS | ××× : 2 |

Fig.14

| REPS | REWARD |
|---|---|
| 0〜99 | XP |
| 100〜199 | XP・MONEY・MATERIAL × 1 |
| 200〜299 | XP・MONEY・MATERIAL × 3 |
| 300〜399 | XP・MONEY・MATERIAL × 3・ITEM × 2 |
| 400〜499 | XP・MONEY・MATERIAL × 5・ITEM × 3 |
| 500 | XP・MONEY・MATERIAL × 5・ITEM × 5 |

INFORMATION PROCESSING SYSTEM, STORAGE MEDIUM STORING INFORMATION PROCESSING PROGRAM, AND INFORMATION PROCESSING METHOD

CROSS REFERENCE TO RELATED APPLICATION

The disclosure of Japanese Patent Application No. 2019-158044 filed on Aug. 30, 2019 is incorporated herein by reference.

FIELD

The present disclosure relates to an information processing system including a training apparatus, and a storage medium storing an information processing program and an information processing method for use with the information processing system.

BACKGROUND AND SUMMARY

There are conventional training apparatuses that can be used as input devices for video games.

There has been room for improvement in motivating the user, who trains using such a training apparatus, to continue training.

Thus, the present application discloses an information processing system, a storage medium storing an information processing program and an information processing method, with which it is possible to motivate the user to train using a training apparatus.

(1)

An example information processing system described herein includes a training apparatus and an information processing apparatus. The information processing apparatus includes a one or more processor configured to execute a game. The training apparatus includes a sensor and one or more processor. The sensor is configured to detect a load applied on the training apparatus. The one or more processor of the training apparatus is configured to transmit information relating to the load detected by the sensor as first information to the information processing apparatus while the game is executed by the game processor. The one or more processor of the training apparatus is configured to store information relating to the load detected by the sensor as second information in a storage device integral with or separate from the training apparatus while the game is not executed by the game processor. The one or more processor of the information processing apparatus progresses the game based on the first information received from the training apparatus. The one or more processor of the information processing apparatus gives a reward that has an influence on the progress of the game to a user of the game based on the second information obtained from the storage device.

With configuration (1) above, by giving a reward, it is possible to motivate the player to train using the training apparatus while the game is not executed. Moreover, since the reward given is a reward that has an influence on the progress of the game, it is possible, with such a reward, to also motivate the player to play the game (that is, train using the training apparatus in the game).

(2)

The one or more processor of the information processing apparatus may give the user a reward that makes it more advantageous for the user to progress through the game when the information obtained from the storage device represents a first load than when the information obtained from the storage device represents a second load smaller than the first load.

With configuration (2) above, it is possible to motivate the player to train more using the training apparatus.

(3)

The one or more processor of the information processing apparatus may display, on a display, at least one of candidate user image relating to a candidate user is to be given a reward, from among users who play the game using the information processing system. The candidate user image represents a name of a candidate user and/or an image of a player character controlled by the candidate user. The candidate user image may include user information relating to a progress of the game for the candidate user and/or information relating to a load applied on the training apparatus by the candidate user. The one or more processor of the information processing apparatus may identify at least one user, from among the candidates represented by the candidate user image, as specified by a player. The one or more processor of the information processing apparatus may give the reward to the specified user.

With configuration (3) above, it is easier for the player to select a user to be given the reward, thereby improving the convenience for the player.

(4)

The one or more processor of the information processing apparatus may identify a user as specified by a player. The identified user is different from the player performing an operation on the information processing system and plays the game using the information processing system or another information processing system different from said information processing system. The one or more processor of the information processing apparatus may give the identified user a gift based on the second information obtained from the storage device.

With configuration (4) above, it is possible to motivate more users to train using the training apparatus.

(5)

The one or more processor of the information processing apparatus may give the reward based on the gift to a user who has been given the gift.

With configuration (5) above, with the gift, it is possible to motivate both the user who sends a gift and the user who receives the gift to play the game.

(6)

One or more processor of the training apparatus may be configured to store operation count information as the second information in the storage device while the game is not executed by the information processing apparatus. The operation count information may represent the number of times an operation of applying a load on the training apparatus is performed. The one or more processor of the information processing apparatus may assign the operation count information obtained from the storage device to a user, and give a reward in accordance with the operation count information to the user who is assigned the operation count information. The one or more processor of the information processing apparatus may set an upper limit to at least one of the number of times operation count information is assigned to one user for a unit period and the total of the operation counts represented by the operation count information assigned to one user for the unit period.

With configuration (6) above, it is possible to reduce the possibility that the playability of the game may lower for a user as a result of receiving a lot of reward, thus making the difficulty level of the game too low.

(7)

When first operation count information obtained during a first unit period and second operation count information obtained during a second unit period are assigned to one user, the one or more processor of the information processing apparatus may give a reward in accordance with the first operation count information and a reward in accordance with the second operation count information to the user.

With configuration (7) above, it is possible to prevent the amount of training from becoming too small while the game is not executed, and it is possible to motivate the user to preform an adequate amount of training.

(8)

The information processing system may notify the user that the operation count represented by the operation count information stored in the storage device has reached a predetermined number while the game is not executed by the information processing apparatus. A reward to be given in accordance with operation count information representing the operation count that is greater than or equal to the predetermined number may be more than a reward to be given in accordance with operation count information representing the operation count less than the predetermined number. The reward to be given in accordance with operation count information representing the operation count that is greater than or equal to the predetermined number may be of a different type from a reward to be given in accordance with operation count information representing the operation count less than the predetermined number.

With configuration (8) above, it is possible to improve the convenience for the player who attempts to perform a fitness exercise operation until reaching a round number.

(9)

One or more processor of the training apparatus may be configured to transmit information based on information detected by the sensor as the first information to the information processing apparatus while the game is executed by the information processing apparatus; and store information, that is different from the first information and is calculated from the first information, as the second information in the storage device while the game is not executed by the information processing apparatus.

With configuration (9) above, by storing the second information calculated from the first information, it is possible to reduce the process load on the information processing apparatus while the game is executed. While the game is executed, as the training apparatus transmits the first information, the information processing apparatus can calculate a wider variety of information.

(10)

The first information may be detected by the sensor. The second information may be operation count information representing the number of times an operation of applying a load on the training apparatus is performed.

With configuration (10) above, as simple information such as operation count information is stored, it is possible to reduce the storage capacity of the storage device, and the information processing apparatus can calculate various information based on information detected by the sensor while the game is executed.

Note that the present specification discloses an information processing apparatus according to configurations (1) to (10), and a storage medium storing an information processing program configured to cause a computer to execute various processes on the information processing apparatus.

The present specification also discloses an information processing method to be executed on an information processing system according to configurations (1) to (10).

With the information processing system, the information processing apparatus, the storage medium and the information processing method set forth above, it is possible to motivate the user to train using a training apparatus.

These and other objects, features, aspects and advantages will become more apparent from the following detailed description when taken in conjunction with the accompanying drawings.

BRIEF DESCRIPTION OF THE DRAWINGS

FIG. 13 is a diagram showing an example of a reward giving image;

FIG. 14 is a diagram showing an example of the relationship between the operation count represented by the operation count information and the content of the reward to be given;

DETAILED DESCRIPTION OF NON-LIMITING EXAMPLE EMBODIMENTS

1. Configuration of Game System

Figure 1:
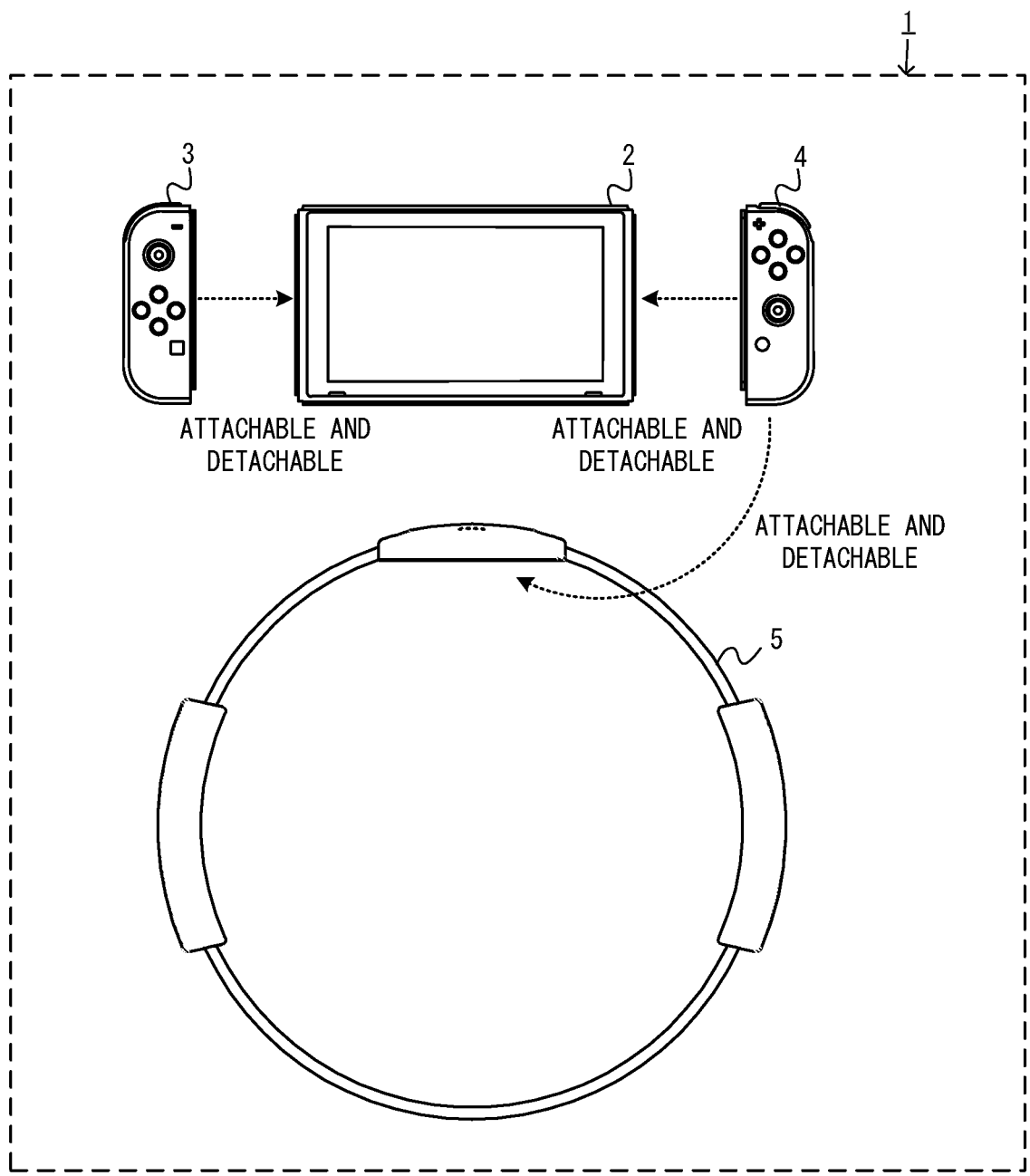
FIG. 1 is a diagram showing an example of a non-limiting apparatuses included in a game system.

A game system according to an example of the present embodiment will now be described. FIG. 1 is a diagram showing an example of apparatuses included in the game system. As shown in FIG. 1, a game system 1 includes a main body apparatus 2, a left controller 3, a right controller 4, and a ring-shaped extension apparatus 5.

The main body apparatus 2 is an example of an information processing apparatus, and functions as a game device main body in the present embodiment. The left controller 3 and the right controller 4 are attachable to and detachable from the main body apparatus 2 (see FIG. 1 and FIG. 3). That is, the user can attach the left controller 3 and the right controller 4 to the main body apparatus 2, and use them as a unified apparatus (see FIG. 2). The user can also use the main body apparatus 2 and the left controller 3 and the right controller 4 separately from each other (see FIG. 3). Note that the main body apparatus 2 and the controllers 3 and 4 may hereinafter be referred to collectively as a "game apparatus".

The ring-shaped extension apparatus 5 is an example of an extension apparatus that is used with the right controller 4. The ring-shaped extension apparatus 5 is used with the right controller 4 attached thereto. Thus, in the present embodiment, the user can use the right controller 4 while it is attached to the ring-shaped extension apparatus 5 (see FIG. 10). Note that the ring-shaped extension apparatus 5 is not limited for use with the right controller 4, but the left controller 3 may be attachable thereto.

[1-1. Configuration of Game Apparatus]

Figure 2:
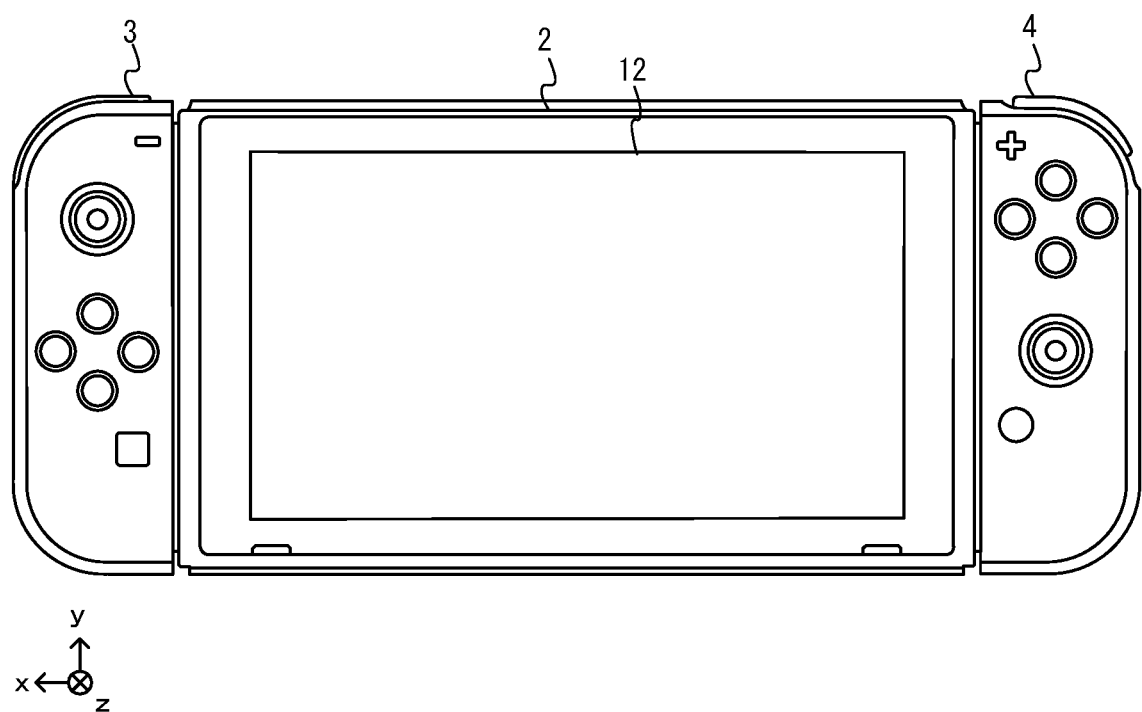
FIG. 2 is a diagram showing an example of a state where a non-limiting left controller and a non-limiting right controller are attached to a non-limiting main body apparatus.

FIG. 2 is a diagram showing an example of the state where the left controller 3 and the right controller 4 are attached to the main body apparatus 2. As shown in FIG. 2, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 3:
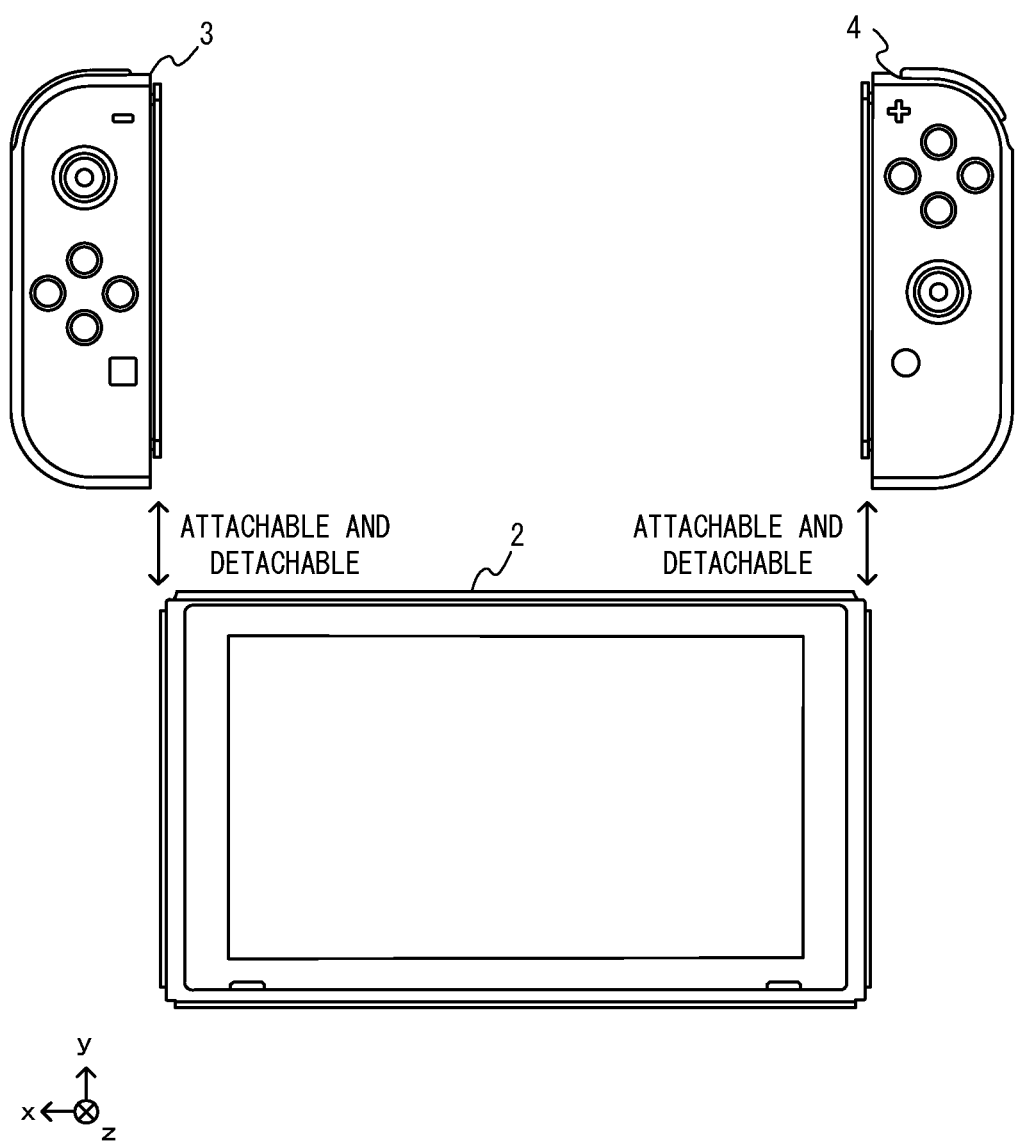
FIG. 3 is a diagram showing a state where a non-limiting left controller and a non-limiting right controller are detached from a non-limiting main body apparatus.

FIG. 3 is a diagram showing an example of the state where each of the left controller 3 and the right controller 4 is detached from the main body apparatus 2. As shown in FIGS. 2 and 3, the left controller 3 and the right controller 4 are attachable to and detachable from the main body apparatus 2. It should be noted that hereinafter, the left controller 3 and the right controller 4 will occasionally be referred to collectively as a "controller".

Figure 4:
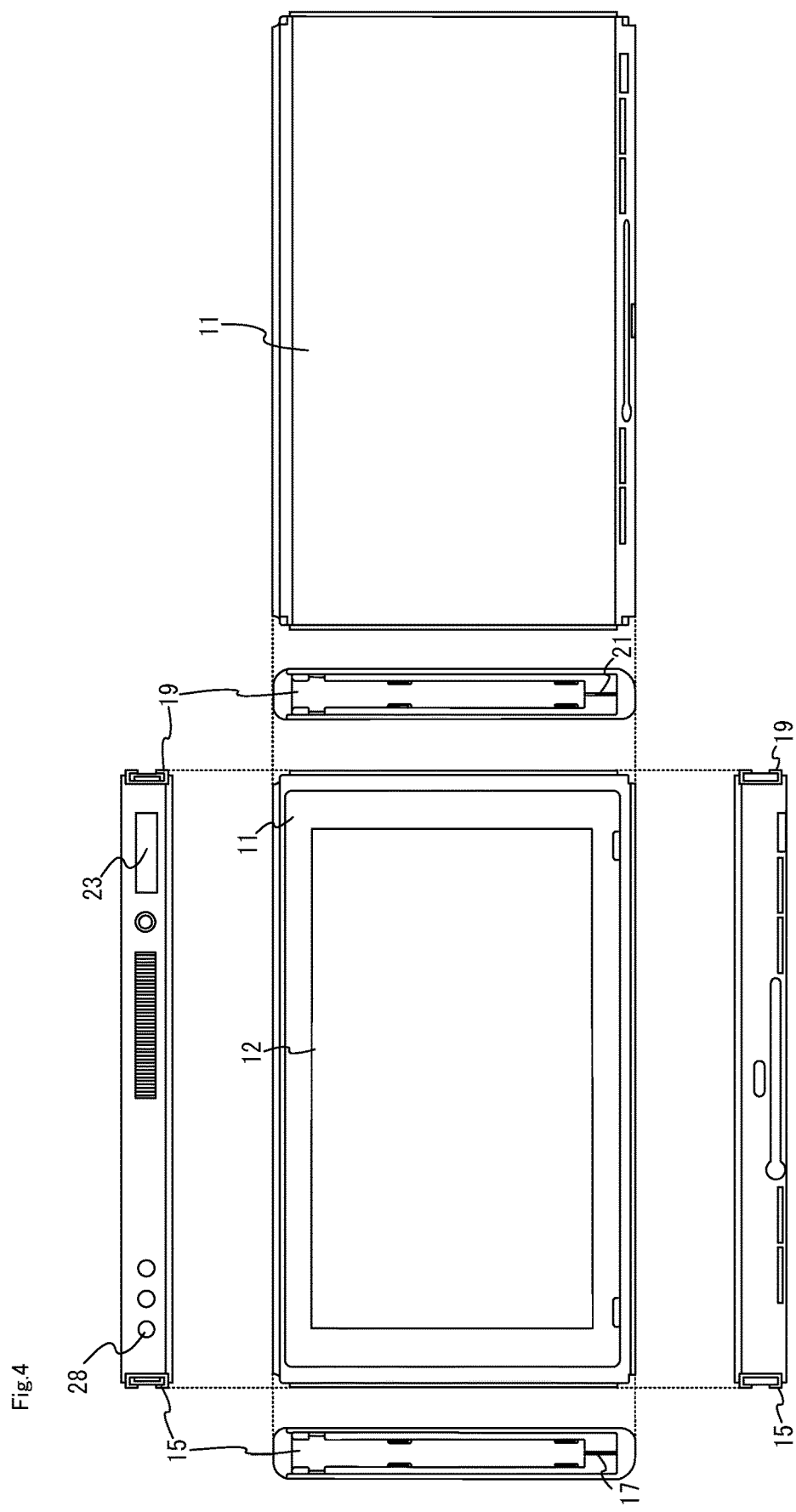
FIG. 4 is six orthogonal views showing an example of a non-limiting main body apparatus.

FIG. 4 is six orthogonal views showing an example of the main body apparatus 2. As shown in FIG. 4, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

As shown in FIG. 4, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type. Note that the main body apparatus 2 may output the image to an external monitor.

The main body apparatus 2 includes speakers within the housing 11. As shown in FIG. 4, speaker holes 11a and 11b are formed on the main surface of the housing 11. Then, sounds output from the speakers are output through the speaker holes 11a and 11b.

The main body apparatus 2 includes a left-side terminal 17 that enables wired communication between the main body apparatus 2 and the left controller 3, and a right-side terminal 21 that enables wired communication between the main body apparatus 2 and the right controller 4.

As shown in FIG. 4, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

Figure 5:
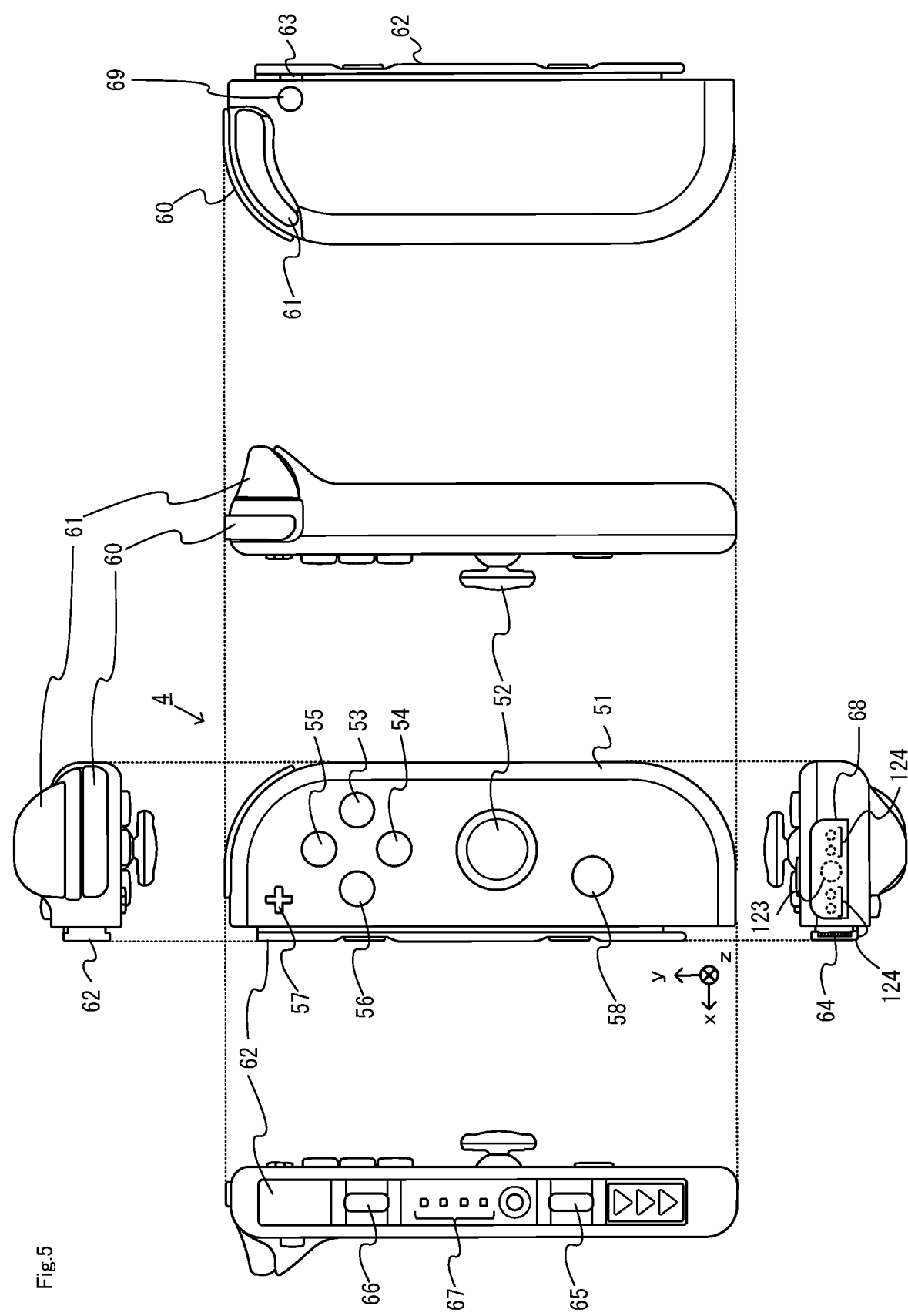
FIG. 5 is six orthogonal views showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, e.g., is shaped to be long in the up-down direction (i.e., a y-axis direction shown in FIG. 5). In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

The right controller 4 includes an analog stick 52 as a direction input section. As shown in FIG. 5, the analog stick 52 is provided on a main surface of the housing 51. The user tilts a shaft portion of the analog stick 52 and thereby can input a direction corresponding to the direction of the tilt (and input a magnitude corresponding to the angle of the tilt). It should be noted that the right controller 4 may include a directional pad, a slide stick that allows a slide input, or the like as the direction input section, instead of the analog stick. Further, in the exemplary embodiment, it is possible to provide an input by pressing the analog stick 52.

The right controller 4 includes various operation buttons. The right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, the right controller 4 includes a second L-button 65 and a second R-button 66, on the side surface of the housing 51 on which the right controller 4 is attached to the main body apparatus 2. These operation buttons are used to give instructions depending on various programs (e.g., an OS program and an application program) executed by the main body apparatus 2.

The right controller 4 includes a terminal 64 that enables wired communication between the right controller 4 and the main body apparatus 2.

As shown in FIG. 5, the right controller 4 includes indicator LEDs 67. The indicator LEDs 67 are an indicator section for notifying the user of predetermined information.

The indicator LEDs 67 are provided on the slider 62, specifically, on the engaging surface of the slider 62 (i.e., the surface that faces the x-axis positive direction side shown in FIG. 5). In the present embodiment, the right controller 4 includes four LEDs as the indicator LEDs 67. For example, the predetermined information includes a number that is assigned by the main body apparatus 2 to the right controller 4, and information relating to the remaining battery level of the right controller 4.

Note that as does the right controller 4, the left controller 3 also includes four indicator LEDs 45 (see FIG. 5). The left controller 3 includes a terminal that enables wired communication between the left controller 3 and the main body apparatus 2.

Figure 6:
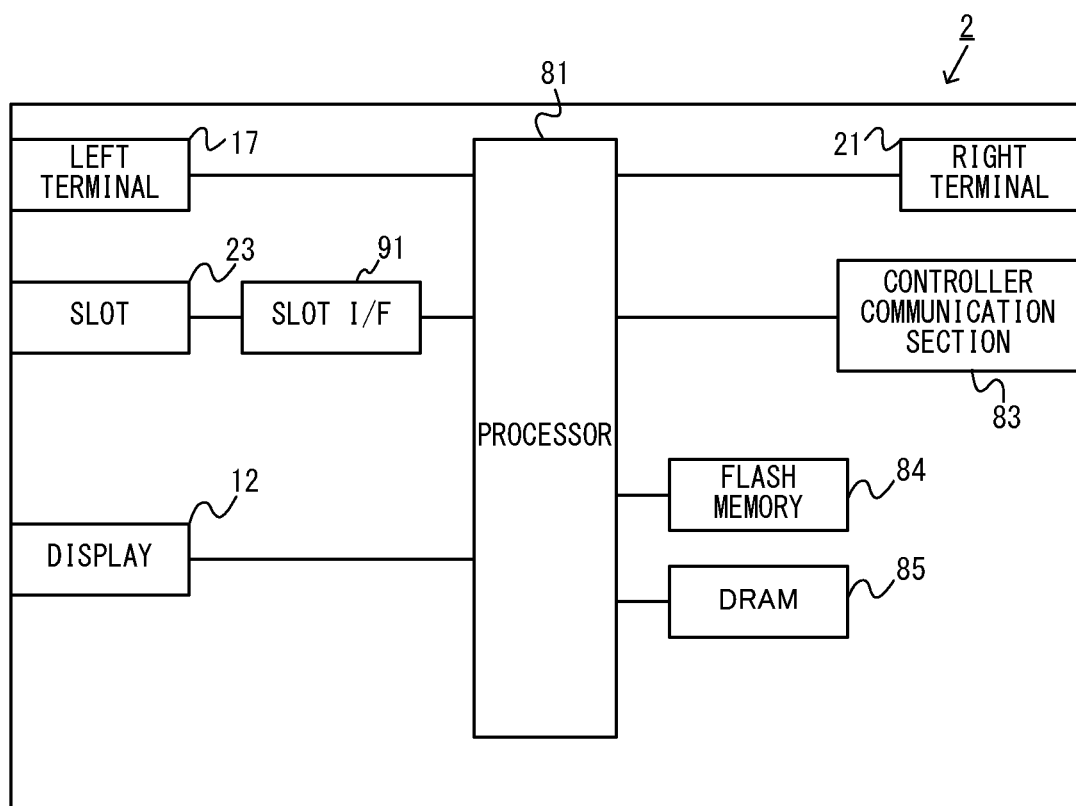
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 91, 97, and 98 shown in FIG. 6 in addition to the components shown in FIG. 4. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, a processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage medium (e.g., an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external device via a network. In the exemplary embodiment, as a first communication form, the network communication section 82 connects to a wireless LAN and communicates with an external device, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main unites 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, a controller communication section 83 performs communication compliant with the Bluetooth (registered trademark) standard with the left controller 3 and with the right controller 4.

Further, the display 12 is connected to the processor 81. The processor 81 displays a generated image (e.g., an image generated by executing the above information processing) and/or an externally acquired image on the display 12.

Figure 7:
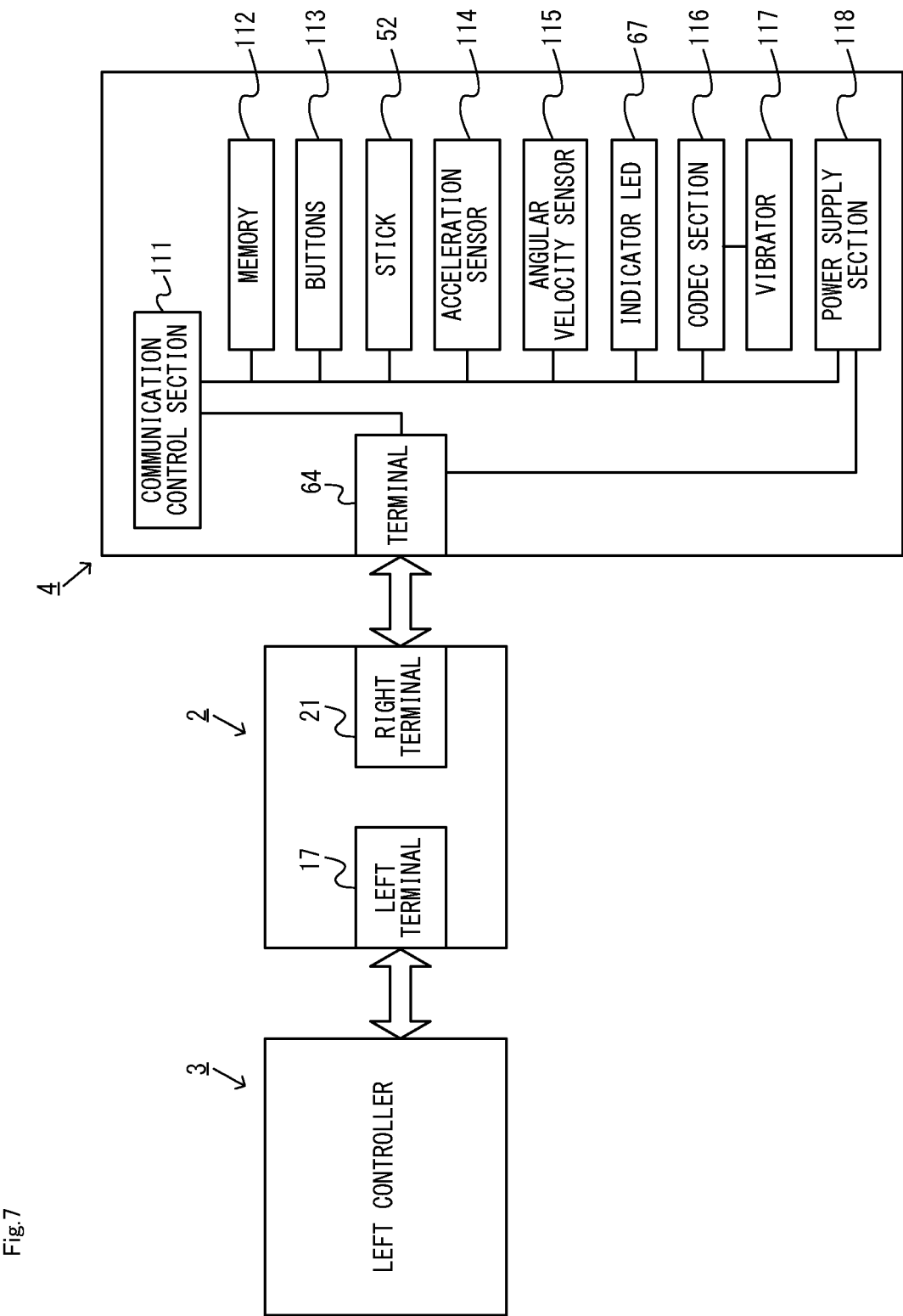
FIG. 7 is a block diagram showing an example of an internal configuration of a non-limiting main body apparatus, a non-limiting left controller and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The right controller 4 includes a communication control section 111, which communicates with the main body apparatus 2. As shown in FIG. 7, a communication control section 111 is connected to components including the terminal 64. In the exemplary embodiment, the communication control section 111 can communicate with the main body apparatus 2 through both wired communication via a terminal 64 and wireless communication not via the terminal 64. The communication control section 111 controls the method for communication performed by the right controller 4 with the main body apparatus 2. That is, when the right controller 4 is attached to the main body apparatus 2, the communication control section 111 communicates with the main body apparatus 2 via the terminal 64. Further, when the right controller 4 is detached from the main body apparatus 2, the communication control section 111 wirelessly communicates with the main body apparatus 2 (specifically, the controller communication section 83). The wireless communication between the communication control section 111 and the controller communication section 83 is performed in accordance with the Bluetooth (registered trademark) standard, for example.

Further, the right controller 4 includes a memory 112 such as a flash memory. The communication control section 111 includes, for example, a microcomputer (or a microprocessor) and executes firmware stored in the memory 112, thereby performing various processes.

The right controller 4 includes buttons 103 (specifically, the buttons 53 to 58, 60, 61, 65, and 66). Further, the right controller 4 includes the analog stick ("stick" in FIG. 7) 52. Each of the buttons 113 and the analog stick 52 outputs information regarding an input performed on itself to the communication control section 111 repeatedly at appropriate timing.

The right controller 4 includes inertial sensors. Specifically, the right controller 4 includes an acceleration sensor 114. Further, the right controller 4 includes an angular velocity sensor 115. In the exemplary embodiment, an acceleration sensor 114 detects the magnitudes of accelerations along predetermined three axial (e.g., xyz axes shown in FIG. 5) directions. It should be noted that the acceleration sensor 114 may detect an acceleration along one axial direction or accelerations along two axial directions. In the exemplary embodiment, an angular velocity sensor 115 detects angular velocities about predetermined three axes (e.g., the xyz axes shown in FIG. 5). It should be noted that the angular velocity sensor 115 may detect an angular velocity about one axis or angular velocities about two axes. Each of the acceleration sensor 114 and the angular velocity sensor 115 is connected to the communication control section 111. Then, the detection results of the acceleration sensor 114 and the angular velocity sensor 115 are output to the communication control section 111 repeatedly at appropriate timing.

The communication control section 111 acquires information regarding an input (e.g., information regarding an operation or the detection result of the sensor) from each of input sections (specifically, the buttons 113, the analog stick 52, and the sensors 114 and 115). The communication control section 111 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the right controller 4. That is, the main body apparatus 2 can determine inputs on the buttons 113 and the analog stick 52 based on the operation data. Further, the main body apparatus 2 can calculate information regarding the motion and/or the orientation of the right controller 4 based on the operation data (specifically, the detection results of the acceleration sensor 114 and the angular velocity sensor 115).

The right controller 4 includes a vibrator 117 for giving notification to the user by a vibration. In the exemplary embodiment, the vibrator 117 is controlled by a command from the main body apparatus 2. That is, if receiving the above command from the main body apparatus 2, the communication control section 111 drives the vibrator 117 in accordance with the received command. Here, the right controller 4 includes a codec section 116. If receiving the above command, the communication control section 111 outputs a control signal corresponding to the command to the codec section 116. The codec section 116 generates a driving signal for driving the vibrator 117 from the control signal from the communication control section 111 and outputs the driving signal to the vibrator 117. Consequently, the vibrator 117 operates. Note that in the present embodiment, the vibrator 117 is a voice coil motor. That is, the vibrator 117 is capable of generating a vibration in accordance with the signal input thereto and generating a sound in accordance with the signal. For example, when a signal of a frequency in the audible range is input to the vibrator 117, a vibration section 271 generates a vibration and generates a sound (i.e., an audible sound).

The right controller 4 includes a power supply section 118. In the exemplary embodiment, the power supply section 118 includes a battery and a power control circuit. Although not shown in FIG. 7, the power control circuit is connected to the battery and also connected to components of the right controller 4 (specifically, components that receive power supplied from the battery).

Note that although not shown in the figures, the left controller 3 includes like elements to those of the right controller 4 shown in FIG. 7.

[1-2. Configuration of Ring-Shaped Extension Apparatus]

Figure 8:
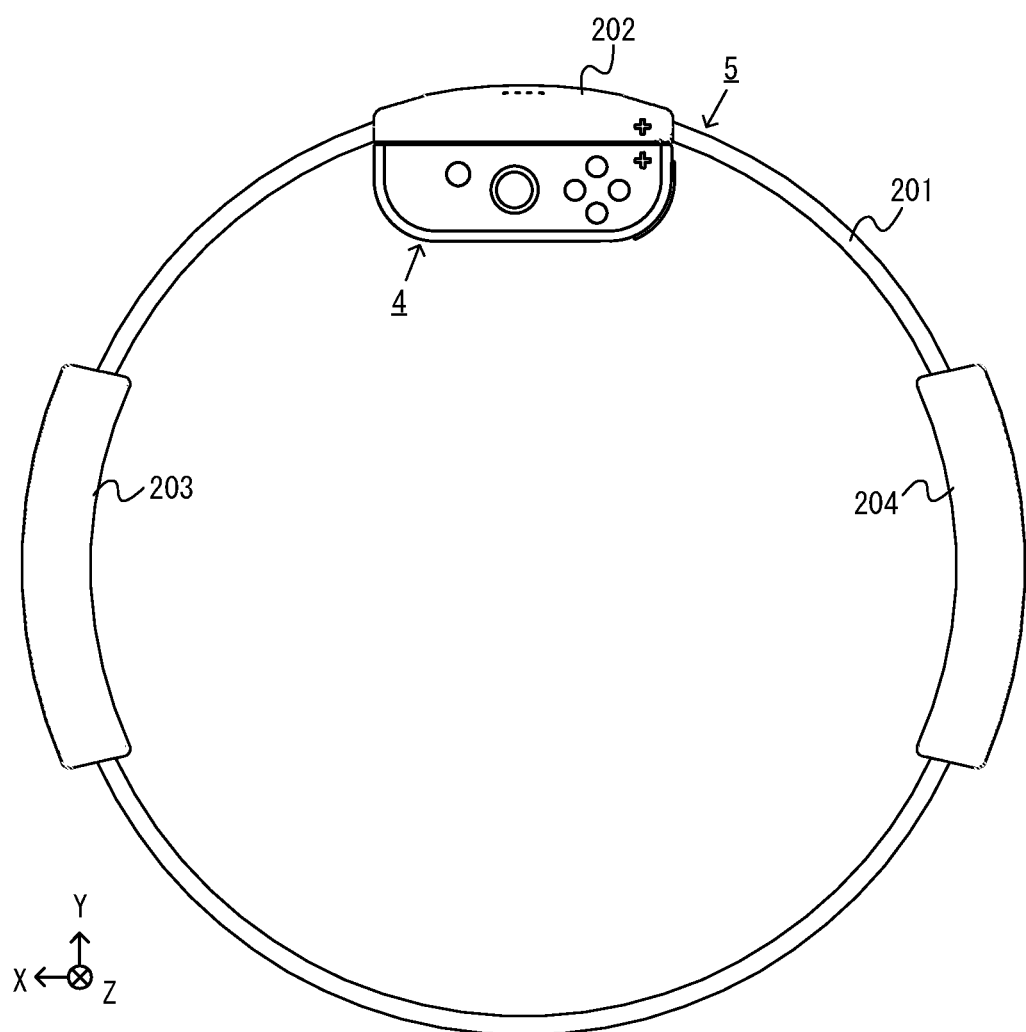
FIG. 8 is a diagram showing an example of a non-limiting ring-shaped extension apparatus 5.

FIG. 8 is a diagram showing an example of a ring-shaped extension apparatus. Note that FIG. 8 shows the ring-shaped extension apparatus 5 with the right controller 4 attached thereto. In the present embodiment, the ring-shaped extension apparatus 5 is an extension apparatus to which the right controller 4 can be attached. Although the details will be described later, the user performs a novel operation of applying a force to, and deforming, the ring-shaped extension apparatus 5 in the present embodiment. The user can operate the ring-shaped extension apparatus 5 by performing a fitness exercise operation using the ring-shaped extension apparatus 5 as if the user were doing an exercise, for example.

As shown in FIG. 8, the ring-shaped extension apparatus 5 includes a ring-shaped portion 201 and a main portion 202. The ring-shaped portion 201 has a ring shape. Note that in the present embodiment, the ring-shaped portion 201 includes an elastic member and a base portion and is formed in a ring shape. In the present embodiment, the ring-shaped portion 201 has a circular ring shape. Note that in other embodiments, the ring-shaped portion 201 may be of any shape, e.g., an elliptical ring shape.

The main portion 202 is provided on the ring-shaped portion 201. The main portion 202 includes a rail portion (not shown). The rail portion is an example of an attachment portion to which the right controller 4 can be attached. In the present embodiment, the rail portion slidably engages with the slider 62 of the right controller 4 (see FIG. 5). As the slider 62 is inserted into the rail member in a predetermined straight direction (i.e., the slide direction), the rail member engages with the slider 62 so that the slider 62 is slidable against the rail member in the straight direction. The rail portion is similar to the rail portion of the main body apparatus 2 in that it is slidably engageable with the slider of the controller. Therefore, the rail portion may have a similar configuration to that of the rail portion of the main body apparatus 2.

In the present embodiment, the direction parallel to the direction (referred to as the "front view direction") in which the ring formed by the ring-shaped portion 201 is viewed from front is the front-rear direction of the ring-shaped extension apparatus 5 (i.e., the Z-axis direction shown in FIG. 8). For example, "the direction in which the ring is viewed from front" is the direction from which the area of the shape represented by the outer edge of the ring appears largest. Where the ring is a circular ring, the "front view direction" can also be said to be the direction from which the ring appears circular.

The rail portion is provided on one side in the front-rear direction relative to the ring-shaped portion 201. Note that in the present embodiment, this side is denoted as the front side (in other words, the front near side) of the ring-shaped extension apparatus 5, and the opposite side thereto is denoted as the rear side (in other words, the back side) of the ring-shaped extension apparatus 5.

In the present embodiment, the right controller 4 includes a latch portion 63 (see FIG. 5). The latch portion 63 is provided so as to protrude sideways (i.e., the z-axis positive direction shown in FIG. 5) from the slider 62. While the latch portion 63 is allowed to move into the slider 62, the latch portion 63 is urged (e.g., by means of a spring) into the position described above in which the latch portion 63 is protruding sideways. The rail portion 211 is provided with a notch 219. The latch portion 63 engages with the notch 219 in a state where the slider 62 is inserted to the far end of the rail portion. As the latch portion 63 engages with the notch 219 while the rail portion is in engagement with the slider 62, the right controller 4 is attached to the main portion 202.

Note that the right controller 4 includes the release button 69 that can be pressed (see FIG. 5). In response to the release button 69 being pressed, the latch portion 63 moves into the slider 62, achieving the state where the latch portion 63 no longer (or substantially no longer) protrudes relative to the slider 62. Therefore, when the release button 69 is pressed in the state where the right controller 4 is attached to the main portion 202 of the ring-shaped extension apparatus 5, the latch portion 63 is no longer (or is substantially no longer) in engagement with the notch. Thus, in the state where the right controller 4 is attached to the main portion 202 of the ring-shaped extension apparatus 5, the user can easily remove the right controller 4 from the ring-shaped extension apparatus 5 by pressing the release button 69.

As shown in FIG. 8, the ring-shaped extension apparatus 5 includes grip covers 203 and 204. The grip covers 203 and 204 are components to be held by the user. In the present embodiment, with the provision of the grip covers 203 and 204, it is easier for the user to hold the ring-shaped extension apparatus 5. The details of the grip covers 203 and 204 will now be described.

As shown in FIG. 8, in the present embodiment, two grip covers 203 and 204 are provided on the ring-shaped portion 201. In the present embodiment, the grip covers 203 and 204 can be removed from the ring-shaped portion 201. The grip covers 203 and 204 are put on the grip portions of the ring-shaped portion 201. Herein, a grip portion is a portion of the ring-shaped portion 201 to be held by the user. In the present embodiment, a portion of the ring-shaped portion 201 near the right end thereof and a portion of the ring-shaped portion 201 near the left end thereof are the grip portions. That is, it can be said that when the main portion 202 is located at the central angle of 0° with respect to the center of the ring-shaped portion 201, the grip portions are provided at around the position of +90° and at around the position of −90°. Hereinafter, the grip portion near the right end of the ring-shaped portion 201 will be referred to as the right grip portion, and the grip portion near the left end of the ring-shaped portion 201 will be referred to as the left grip portion. Although not shown in the figures, each grip portion is provided with an element that allows the grip cover 203 or 204 to be put on. Where the grip cover 203 or 204 is removable from the ring-shaped portion 201 as in the present embodiment, the portion where the element that allows the grip cover 203 or 204 to be put on is provided can be said to be the grip portion.

Note that the grip portions may have any configuration such that the grip portions can be recognized distinguished from the other portions of the ring-shaped portion 201. For example, when portions of the ring-shaped portion 201 (specifically, a portion near the left end and a portion near the right end of the ring-shaped portion 201) are of a different color and/or a different pattern from the other portions, they can be said to be grip portions (as they serve to allow the user to realize that they are the portions to be held for performing operations). When portions of the ring-shaped portion 201 (specifically, a portion near the left end and a portion near the right end of the ring-shaped portion 201) are formed to be thicker than the other portions, they can be said to be grip portions (as they serve to allow the user to realize that they are the portions to be held for performing operations). For example, when similar members to the grip covers are non-removably secured to the ring-shaped portion 201, those members can be said to be grip portions. As described above, with the grip portions, the ring-shaped extension apparatus 5 allows the user to perform operations while holding appropriate positions thereof.

Figure 9:
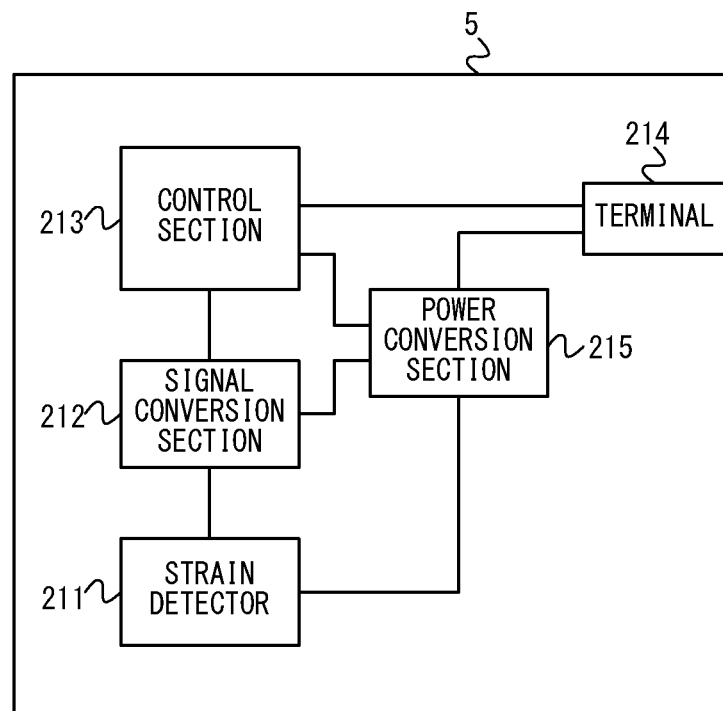
FIG. 9 is a block diagram showing an example of an internal configuration of the non-limiting ring-shaped extension apparatus 5.

FIG. 9 is a block diagram showing an electrical connection relationship between components of the ring-shaped extension apparatus 5. As shown in FIG. 9, the ring-shaped extension apparatus 5 includes a strain detector 211. The strain detector 211 is an example of a detector that detects deformation of the ring-shaped portion 201. In the present embodiment, the strain detector 291 includes a strain gauge. The strain detector 211 outputs a signal representing the strain of the base portion 242 in accordance with the deformation of the elastic member described below (in other words, a signal representing the magnitude of deformation and the direction of deformation of the elastic member).

Herein, in the present embodiment, the ring-shaped portion 201 includes an elastically-deformable elastic portion and a base portion. The base portion holds the opposite end portions of the elastic member so that the base portion and the elastic member together form a ring shape. Note that the base portion is not shown in FIG. 8 since the base portion is provided inside the main portion 202. The base portion is made of a material having a higher rigidity than the elastic member. For example, the elastic member is made of a resin (e.g., an FRP (Fiber Reinforced Plastics)), and the base portion is made of a metal. The strain gauge is provided on the base portion and detects the strain of the base portion. When the ring-shaped portion 201 deforms from the normal state, a strain occurs on the base portion due to the deformation, and the strain on the base portion is detected by the strain gauge. Based on the detected strain, it is possible to calculate the direction in which the ring-shaped portion 201 deforms (i.e., whether it is the direction in which the two grip covers 203 and 204 move closer to each other or the direction in which they move away from each other) and calculate the amount of deformation.

Note that in other embodiments, the strain detector 211 may include, instead of the strain gauge, any sensor that is capable of detecting the deformation of the ring-shaped portion 201 from the normal state. For example, the detector 211 may include a pressure sensor for detecting the pressure that is applied when the ring-shaped portion 201 is deformed, or may include a bend sensor for detecting the amount by which the ring-shaped portion 201 is bent.

The ring-shaped extension apparatus 5 includes a signal converter 212. In the present embodiment, the signal converter 212 includes an amplifier and an AD converter. The signal converter 212 is electrically connected to the strain detector 211 so as to amplify the output signal from the strain detector 211 through the amplifier and performs an AD conversion through the AD converter. The signal converter 212 outputs a digital signal representing the strain value detected by the strain detector 211. Note that in other embodiments, the signal converter 212 may not include an AD converter, and a control section 213 to be described below may include an AD converter.

The ring-shaped extension apparatus 5 includes the control section 213. The control section 213 is a processing circuit including a processor and a memory, and is an MCU (Micro Controller Unit), for example. The control section 213 is electrically connected to the signal converter 212, and the output signal from the signal converter 212 is input to the control section 213. The ring-shaped extension apparatus 5 includes the terminal 214. The terminal 214 is electrically connected to the processing section 213. When the right controller 4 is attached to the ring-shaped extension apparatus 5, a control section 213 sends information representing the strain value that is represented by the output signal from the signal converter 212 (in other words, the ring operation data) to the right controller 4 through the terminal 214.

The ring-shaped extension apparatus 5 includes a power converter 215. The power converter 215 is electrically connected to the sections 211 to 214. The power converter 215 supplies power, which is supplied from the outside (e.g., the right controller 4) through the terminal 214, to the sections 211 to 214. The power converter 215 may supply the supplied power to the sections 211 to 214 after voltage adjustment, etc.

Note that the "data regarding the detection result of the strain detector" that is transmitted by the ring-shaped extension apparatus 5 to another device may be data representing the detection result (in the present embodiment, the output signal from the strain detector 211 representing the strain of the base portion) itself, or may be data that is obtained by performing some processes on the detection result (e.g., data format conversion and/or an arithmetic process on the strain value, etc.). For example, the control section 213 may perform a process of calculating the amount of deformation of the elastic member based on the strain value, which is the detection result, and the "data regarding the detection result of the strain detector" may be data that represents the amount of deformation.

Note that in other embodiments, the ring-shaped extension apparatus 5 may include a battery and may operate by using power from the battery. The battery of the ring-shaped extension apparatus 5 may be a rechargeable battery that can be charged by power supplied from the right controller 4.

Figure 10:
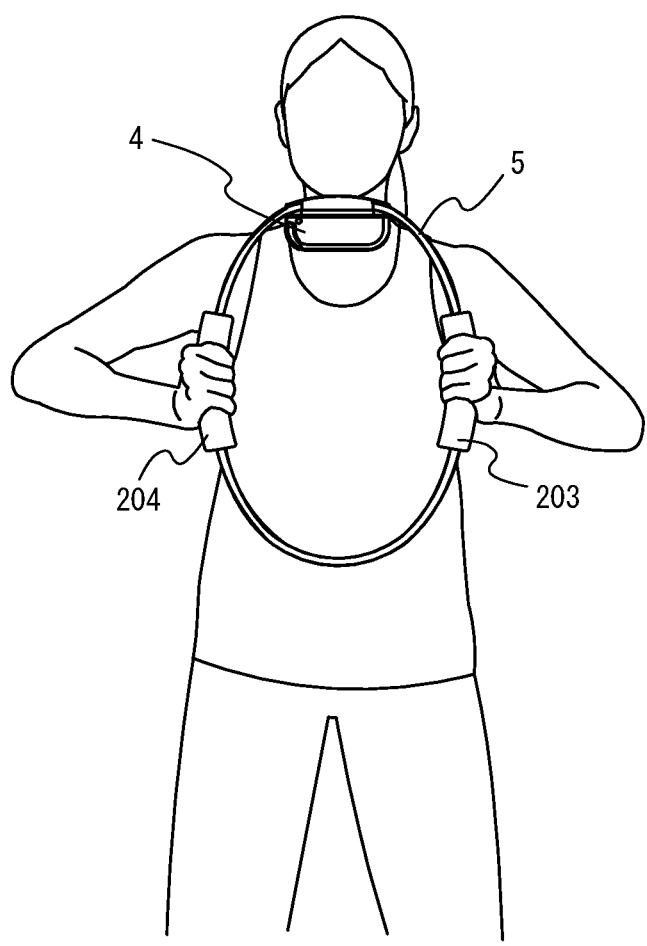
FIG. 10 is a diagram showing an example of how the non-limiting ring-shaped extension apparatus 5 is used by the user.

FIG. 10 is a diagram showing an example of how the ring-shaped extension apparatus 5 is used by the user. As shown in FIG. 10, the user can play a game using the ring-shaped extension apparatus 5 in addition to a game apparatus (e.g., the main body apparatus 2 and the controllers 3 and 4).

For example, as shown in FIG. 10, the user holds the ring-shaped extension apparatus 5 with the right controller 4 attached thereto with both hands. The user can play a game by performing an operation using the ring-shaped extension apparatus 5 (e.g., an operation of deforming the ring-shaped extension apparatus 5 and an operation of moving the ring-shaped extension apparatus 5).

Note that FIG. 10 shows an example of how the user holds the grip covers 203 and 204 and deforms the ring-shaped extension apparatus 5 by pushing in the ring-shaped extension apparatus 5. Through this action, the user can perform, as a game operation, a fitness exercise operation of training the arms. Note that the user can perform a game operation through any of various operations performed using the ring-shaped extension apparatus 5. For example, the user can perform an operation of deforming the ring-shaped extension apparatus 5 with one of the grip covers held by both hands and the other grip cover pressed against the belly. Through this action, the user can perform, as a game operation, a fitness exercise operation of training the arms and the abdominal muscles. The user can perform the operation of deforming the ring-shaped extension apparatus 5 while holding the ring-shaped extension apparatus 5 between the legs with the grip covers 203 and 204 pressed against the inner thighs of the legs. Through this action, the user can perform, as a game operation, a fitness exercise operation of training the leg muscles. Thus, according to the present embodiment, by using the ring-shaped extension apparatus 5, which has a ring shape, the user can perform a wide variety of fitness exercise operations.

Note that the ring-shaped extension apparatus 5 with the right controller 4 attached thereto may hereinafter be referred to as a "training apparatus". Note that in other embodiments, a training apparatus is not limited to two apparatuses that can be attached to each other but may be a single apparatus.

2. Process of Game System

Referring to FIG. 11 to FIG. 15, processes to be executed on the game system 1 will be described. In the present embodiment, the main body apparatus 2 executes a game in which the player uses a training apparatus as described above. Specifically, the main body apparatus 2 executes a game in which the player performs game operations by performing fitness exercise operations of deforming the training apparatus. In the present embodiment, the player can perform fitness exercise operations using the training apparatus even during a period in which the game is not being executed on the main body apparatus 2 (hereinafter referred to as the "non-game period"). Then, when a game is thereafter executed on the main body apparatus 2, a reward that has an influence on the progress of the game is given to the player depending on the results of the fitness exercise operations performed during the non-game period. Thus, by giving a reward to the player, it is possible to motivate the player to perform fitness exercise operations while the game is not being executed. Since the reward is a reward that has an influence on the progress of the game, it is possible to also motivate the player to play the game (that is, perform fitness exercise operations in the game) after performing fitness exercise operations while the game is not being executed.

Herein, in the present embodiment, a plurality of users can be registered with the main body apparatus 2 as users who use game applications of the main body apparatus 2. Note that a user who is registered with a game application of the main body apparatus 2 is a user, among the users registered with the main body apparatus 2, whose account for the game application has been created. In the present embodiment, the user creates an account before initially playing the game, and only users who have created their accounts can play the game. The term "a user whose account has been created" means to include a user having save data stored in association with the user.

In the present embodiment, among the users registered with the game application of the main body apparatus 2, the user who is performing operations on the game system 1 (i.e., the user who is currently using the training apparatus or the user who is currently using the game application) may be referred to as the player.

Figure 11:
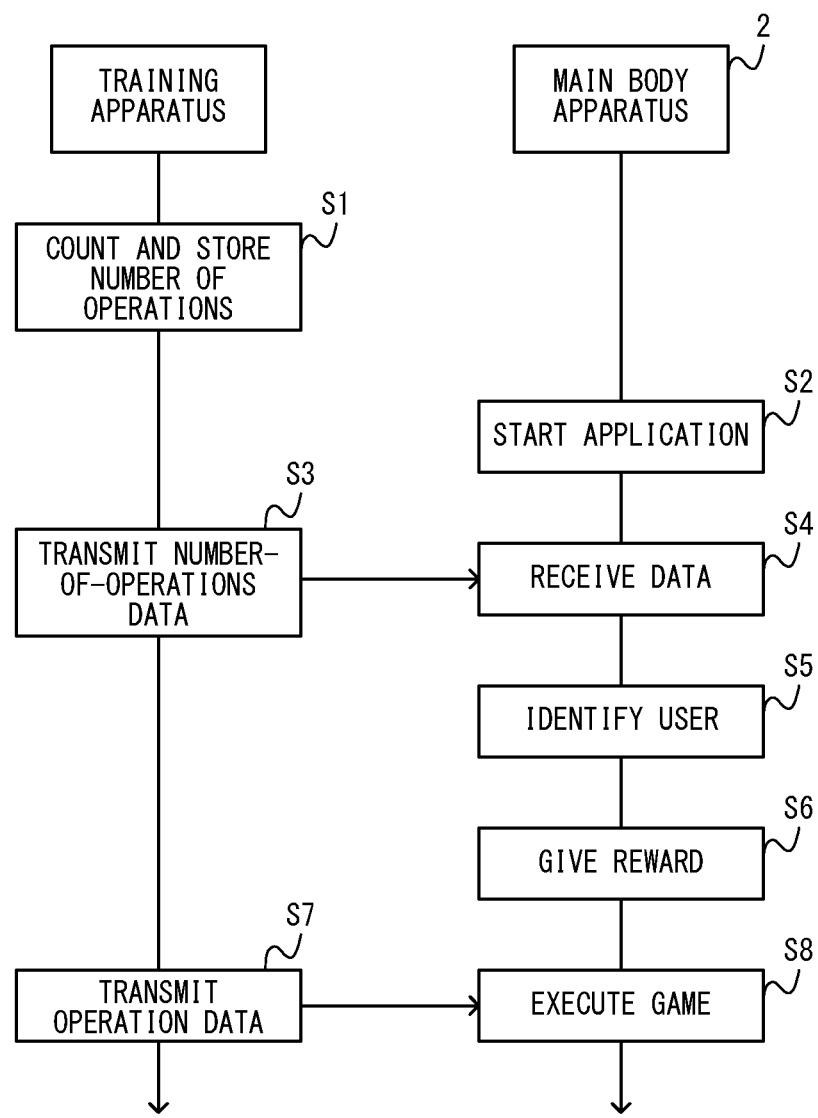
FIG. 11 is a diagram showing an example of a flow of a process executed on a non-limiting game system 1.

FIG. 11 is a diagram showing an example of a flow of a process executed on the game system 1. Note that as an example, FIG. 11 shows the flow for a case where the player performs a fitness exercise operation using the training apparatus during the non-game period, after which a game application is started on the main body apparatus 2 to execute the game. Note that it is optional to play a fitness exercise operation using the training apparatus during the non-game period, and the player is not required to perform the fitness exercise operation before the game.

[2-1. Process During Non-Game Period]

In the present embodiment, the player performs fitness exercise operations using the training apparatus during the non-game period. The training apparatus operates in the independent operation mode. The independent operation mode is a mode in which the training apparatus executes processes independently of the main body apparatus 2. In the independent operation mode, the training apparatus operates without communicating with the main body apparatus 2, and there is no need for the main body apparatus 2 to be operating.

There is no limitation on the condition for the training apparatus to start operating in the independent operation mode. In the present embodiment, the independent operation mode is started on the condition that a predetermined start operation on the training apparatus (e.g., pressing down the analog stick 52 of the right controller 4) is detected in a state where wireless communication between the training apparatus (specifically, the right controller 4) and the main body apparatus 2 has not been established. Note that in a state where the wireless connection between the right controller 4 and the main body apparatus 2 has been established is the state where data can be exchanged between the right controller 4 and the main body apparatus 2 via wireless communication.

In the independent operation mode, the training apparatus detects an operation by the player deforming the training apparatus (specifically, the ring-shaped extension apparatus 5), and counts and stores the number of times the operation is performed (step S1). In the present embodiment, the training apparatus detects push-in operations and pull operations performed on the ring-shaped extension apparatus 5. Note that a push-in operation is an operation of deforming the ring-shaped portion 201 in a direction (referred to as the "push-in direction") such that the two grip portions of the ring-shaped extension apparatus 5 come closer to each other. A pull operation is an operation of deforming the ring-shaped portion 201 in a direction (referred to as the "pull direction") such that the two grip portions move away from each other.

The training apparatus calculates the amount of deformation of the ring-shaped extension apparatus 5 based on the strain value output from the strain detector 211, and detects a push-in operation or a pull operation based on the amount of deformation. Specifically, the training apparatus detects a push-in operation when the amount of deformation in the push-in direction is greater than a predetermined push-in threshold, and detects a pull operation when the amount of deformation in the pull direction is greater than a predetermined pull threshold. The training apparatus keeps the operation count by incrementing the count each time a push-in operation or a pull operation is detected.

The training apparatus stores operation count information representing the operation count in a memory of the control section 213 of the ring-shaped extension apparatus 5. In the present embodiment, the memory is a non-volatile memory and retains the data even after the power supply to the ring-shaped extension apparatus 5 is stopped. Note that in other embodiments, the process of keeping the operation count may be executed on the right controller 4, and the operation count information may be stored in the right controller 4. The operation count information may be stored in another apparatus separate from the training apparatus. For example, where the main body apparatus 2 is operating even in the independent operation mode, the operation count information may be stored in the main body apparatus 2.

Note that the ring-shaped extension apparatus 5 keeps the total operation count of push-in operations and pull operations, without distinguishing between these operations in the present embodiment. Note however that in other embodiments, it may separately keep the push-in operation count and the pull operation count and separately store two different operation counts.

In the present embodiment, the training apparatus outputs a sound and a vibration in accordance with a push-in operation and a pull operation. In the present embodiment, the training apparatus outputs a sound and a vibration from the vibrator 117 of the right controller 4 at a timing in accordance with the detection of a push-in operation and at a timing in accordance with the detection of a pull operation.

Note that the training apparatus may output a sound and a vibration at any timing in accordance with an operation. For example, the training apparatus may output a sound and a vibration at a timing when the amount of deformation moves across the push-in threshold and at a timing when the amount of deformation moves across the pull threshold. Note that a timing when the amount of deformation moves across threshold means to include both a timing when the amount of deformation increases above the threshold (i.e., becomes greater than the threshold) and a timing when the amount of deformation decreases below the threshold (i.e., becomes less than the threshold). Then, a sound and a vibration will be output from the right controller 4 at a timing when a push-in operation or a pull operation by the player is detected and at a timing between the detection of a push-in operation or a pull operation and the ring-shaped extension apparatus 5 returning to the normal state.

The training apparatus outputs a sound and a vibration from the right controller 4 in response to the operation count reaching a predetermined round number. In the present embodiment, a round number is an integral multiple of 100 (less than the upper limit number to be described below). Although the details will be described later, a bigger reward is given to the player when the operation count is greater than or equal to a round number than when the operation count is less than a round number (see FIG. 14). Thus, it is possible to notify the player, who aims at performing the fitness exercise operation until a round number is reached, that the target is achieved.

In the present embodiment, an upper limit number is set for the operation count. In the present embodiment, the upper limit number is 500. The training apparatus outputs a sound and a vibration in response to the operation count reaching the upper limit number. When the operation count reaches the upper limit number, the training apparatus stops keeping the operation count and also stops updating the operation count information.

In the present embodiment, when the operation count reaches a round number or the upper limit number, the training apparatus outputs a sound and a vibration, which are output in response to the operation count reaching a round number or the upper limit number instead of outputting a sound and a vibration, which are output in response to detection of a single operation. Note that the training apparatus varies the manner in which a sound and a vibration are output (e.g., the frequency, the volume/intensity, the length, the number of repetitions, etc.) between those that are output in response to each operation, those that are output in response to the operation count reaching a round number, and those that are output in response to the operation count reaching the upper limit number.

While operating in the independent operation mode, the training apparatus repeats the process of counting and storing push-in operations and pull operations. Then, the training apparatus ends operating in the independent operation mode in response to detection of a predetermined end operation performed on the training apparatus. In the present embodiment, the end operation is an operation of pressing down the analog stick 52, as is the start operation described above. Note however that in other embodiments, the end operation may be any operation. Note that after the end of the independent operation mode, the right controller 4 stops supplying power to the ring-shaped extension apparatus 5, and enters the sleep mode. This also stops the power supply from the right controller 4 to the ring-shaped extension apparatus 5, and the ring-shaped extension apparatus 5 also ends operating.

[2-2. Process of Game Application]

In the example shown in FIG. 11, after a fitness exercise operation using the training apparatus during the non-game period is finished, the player plays a game using the training apparatus. First, in response to an instruction by the user, if the main body apparatus 2 is in the sleep mode, the main body apparatus 2 resumes from the sleep mode, and establishes a wireless connection with the training apparatus (specifically, the right controller 4). Herein, when an input on an operation section of the right controller 4 is detected in the state where the wireless connection with the main body apparatus 2 has not been established (excluding a case where the independent operation mode is started in response to the start operation described above and a case where it is operating in the independent operation mode), the right controller 4 executes a communication process for establishing the wireless connection between the right controller 4 and the main body apparatus 2. When a wireless connection is established therebetween through this communication process, the training apparatus starts operating in the main body operation mode. The main body operation mode is a mode in which the training apparatus operates together with the main body apparatus 2, and in which the main body apparatus 2 executes a process based on an input made by the player using the training apparatus (e.g., a process of the game application being executed by the main body apparatus 2). After the start of the operation in the main body operation mode, the main body apparatus 2 starts a game application (in other words, a program) in response to a start-up instruction by the player (step S2). Thus, the game using the training apparatus is started on the game system 1.

After the start of the game application, the main body apparatus 2 performs a series of processes of receiving the operation count information from the training apparatus (step S4), specifying a user who is to be given a reward based on the received operation count information (step S5), and giving the reward to the selected user (step S6). The series of processes will now be described.

In the present embodiment, when the game application is started, a menu image is displayed on the display. Although not shown in the figures, the menu image includes a game mode icon representing an instruction to start a predetermined game mode included in the game application, and a reward giving icon representing an instruction to specify a user who is to be given a reward. When an input specifying the game mode icon is detected, the main body apparatus 2 starts a story mode process of performing the predetermined game mode (herein, a story mode). When an input specifying an image representing a reward giving icon is detected, the main body apparatus 2 starts executing the user specifying process. The user specifying process is a process of specifying a user who is to be given a reward based on the operation count information received from the training apparatus.

[2-2-1. User Specifying Process]

In the user specifying process, first, the main body apparatus 2 obtains the operation count information from the training apparatus. That is, the training apparatus transmits the operation count information stored therein to the main body apparatus 2 (step S3), and the main body apparatus 2 receives the operation count information from the training apparatus (step S4). In the present embodiment, the main body apparatus 2 requests the training apparatus to transmit the operation count information, and the training apparatus transmits the operation count information to the main body apparatus 2 in response to this request.

When the operation count information is obtained, the main body apparatus 2 displays the user selection image on the display. The user selection image is an image for accepting an input of selecting a user who is to be given a reward. Note that in the present embodiment, the display on which the game image is displayed may be the display 12 described above or may be a non-portable monitor.

Figure 12:
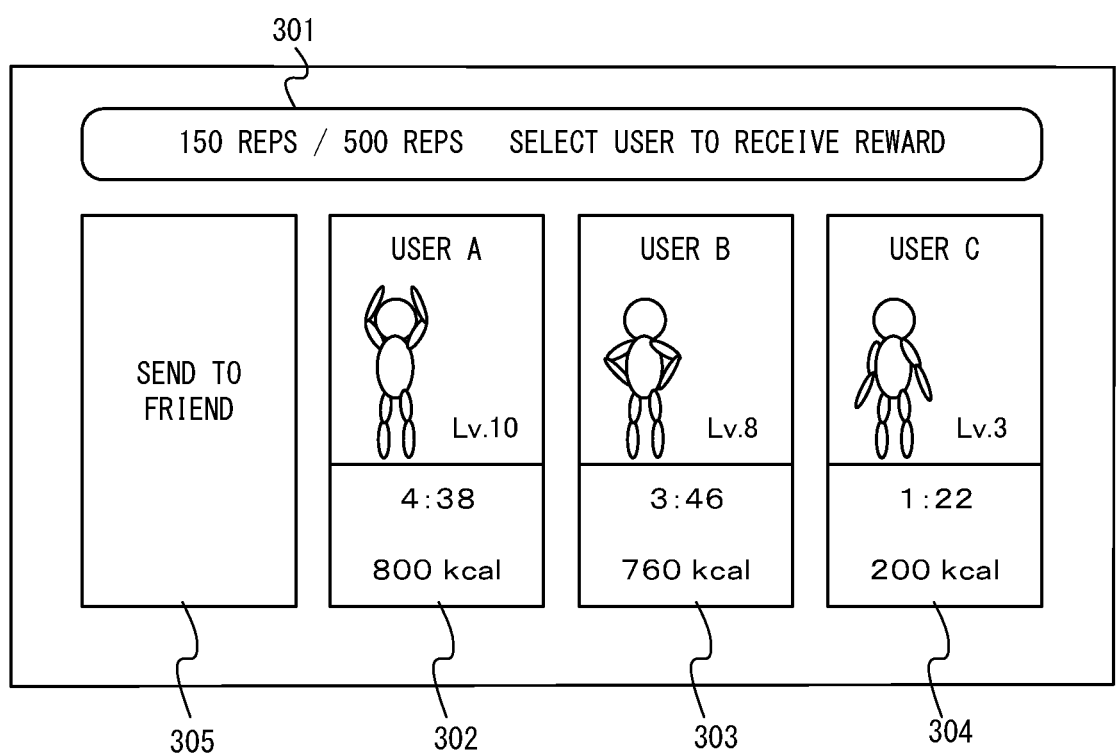
FIG. 12 is a diagram showing an example of a user selection image.

FIG. 12 is a diagram showing an example of the user selection image. As shown in FIG. 12, the user selection image includes a number-of-operations image 301. The number-of-operations image 301 represents the operation count of the obtained operation count information (150 in the example shown in FIG. 12). Thus, the game system 1 can notify the player of the result (i.e., the operation count) of the fitness exercise operation performed during the non-game period before specifying a user to be the reward receiver. Note that in the present embodiment, the number-of-operations image 301 represents the upper limit number (herein, 500) and the operation count. In the present embodiment, the user selection image includes a message prompting the player to select a user to be given a reward that reads "Select user to receive reward".

As shown in FIG. 12, the user selection image includes candidate user images 302 to 304. A candidate user image represents a user who is a candidate for the reward. In the present embodiment, the main body apparatus 2 displays the candidate user image for each user registered with the game application of the main body apparatus 2. Herein, the game system 1 can be used in such a manner that there are a plurality of users registered with the single game system 1 in the present embodiment. In such a case, after the operation count information is stored in the training apparatus as a result of a fitness exercise operation performed by user A using the training apparatus during the non-game period, another user B may possibly start and use the game application on the main body apparatus 2. Then, if a reward based on the operation count information were automatically given to user B, who has started the game application, user A would no longer be given the reward, thus failing to give the reward to the right user. The game system 1 may not be able to specify a user to be given a reward because the user who started the game application is not specified. Therefore, in the present embodiment, in the user specifying process, the game system 1 presents the user selection image to the player and allows the player to select a user to be given the reward. Note that the user selection image may be displayed for all the users registered with the game system 1 or may be displayed only for those of the users that are registered with the game system 1 who are registered as players of the present game application (e.g., users for whom save data has been created).

As shown in FIG. 12, as information with which it is possible to identify a user, the candidate user image includes information of the user name of the user and an image of the player character controlled by the user. The candidate user image also includes information of level, play time and calories burned, as user information relating to the progress of the game for the user. Note that level is the current level of the player character associated with the user. Play time is the amount of time the user has spent playing the game. Calories burned is the calories burned by the user playing the game. Note that in the present embodiment, the main body apparatus 2 calculates the calories burned based on the detection results of fitness exercise operations performed by the user in the game. Checking the candidate user image, the player can select himself/herself or another user as the reward receiver. For example, referring to the progress of the game indicated by the candidate user image, the player can select a user who is behind in the progress as the reward receiver.

As described above, a candidate user image includes user information regarding the progress of the game for a user who is a candidate for the reward. Thus, the player can select a user to be given the reward after checking the progress of the game for each user. This makes it easier for the player to select a user to be given the reward, thereby improving the convenience for the player. Moreover, each user can know the progresses of the other users, thus developing the sense of competition among the users, and it is therefore possible to motivate the users to train using the sense of competition.

The main body apparatus 2 accepts an input of selecting one of candidate user images (and a friend image to be described later) included in the displayed user selection image. Then, when such an input is detected, the main body apparatus 2 identifies the user represented by the selected candidate user image as the user to be given the reward (step S5). Note that in the present embodiment, the user is not given the reward at this point, but the user is given the reward at the start of the story mode. Therefore, upon detecting the input, the main body apparatus 2 assigns (but does not yet give) the operation count information obtained from the training apparatus to the identified user (specifically, stores the operation count information in association with the user).

In the present embodiment, the game system 1 sets an upper limit to the number of times each user can be assigned the operation count information for a predetermined unit period (e.g., 1 day). Specifically, in the game system 1, the number of times each user can be assigned the operation count information is one. The upper limit is provided for the purpose of reducing the possibility that the playability of the game may lower. If each user were allowed to be assigned the operation count information for an unlimited number of times, the user could receive an unlimited amount of reward. Since the reward has an influence on the progress of the game, the difficulty level of the game may possibly become too low if a user receives too much reward. If the difficulty level of the game becomes too low, the playability of the game lowers. Then, the motivation of a user may possibly be lowered because of the reward, which is supposed to be given for the purpose of motivating the user to play the game. In the present embodiment, in order to reduce such a possibility, there is an upper limit for the number of times the operation count information can be assigned, and there is also an upper limit for the amount of reward to be given. Note that in other embodiments, the game system 1 may set an upper limit to the total operation count represented by a plurality of sets of operation count information assigned to a user for a unit period.

Note that as described above, in the present embodiment, there is an upper limit to the number of times each user can be assigned the operation count information for a unit period (or to the total operation count represented by the operation count information to be assigned to a user for a unit period). Therefore, after the upper limit is reached, the user is not motivated to perform a fitness exercise operation using the training apparatus during the non-game period. Note however that in the present embodiment, there is no limit to the amount of time the user plays the game using the training apparatus. Therefore, a user who wishes to do more fitness exercise operations using the training apparatus can satisfy his/her wish by performing fitness exercise operations in the game.

While the user selection image is displayed, if the player selects a user for whom the number of times the operation count information is assigned to the user has reached the upper limit, the game system 1 does not execute the process of assigning the operation count information to the user. In such a case, the game system 1 may notify the player that the user cannot receive the reward by for example displaying a message "User cannot receive reward because reward-receiving limit (once per day) has been reached".

The main body apparatus 2 may display a candidate user image that includes an image indicating that the number of times the operation count information is assigned to the user has reached the upper limit (i.e., the user has already been assigned operation count information). Then, it is possible to notify the player, who sees the candidate user image, of a user or users to which the operation count information cannot be assigned.

In the present embodiment, the operation count information assigned to a user is stored up to a predetermined upper limit number of assignments. Specifically, the main body apparatus 2 stores 10 sets of operation count information for each user. Then, where 10 sets of operation count information are stored for one user, if operation count information is further assigned to the same user, the main body apparatus 2 stores the newest set of operation count information while deleting the first one (i.e., the oldest one) of the 10 sets of operation count information. Note that although the details will be described later, when the player executes the story mode with the operation count information stored, the player is given a reward in accordance with the operation count information at the start of the story mode and the operation count information is deleted. As described above, there is an upper limit to the number of sets of operation count information stored. Therefore, even if the operation count information is repeatedly assigned and the operation count information is not deleted as the predetermined story mode is not executed, it is possible to suppress the increase in the amount of data of the operation count information.

Note that in other embodiments, the operation count information assigned to a user may be stored until expiration of a predetermined valid period (e.g., 10 days) starting from when the operation count information is assigned. For example, when the valid period expires without the story mode being executed by the player within the valid period, the game system 1 may delete the operation count information for which the valid period has expired. After deletion of operation count information, the player is not given a reward for the deleted operation count information.

As described above, in other embodiments, the game system 1 may give the user a reward in accordance with operation count information on the condition that the valid period, which is longer than the unit period, has not expired since the operation count information was assigned to the user. Then, it is possible to motivate the user to play the game during the valid period, thus encouraging the user to play the game on a continuous basis.

Note that in other embodiments, the candidate user image may include user information relating to the operation count information obtained from the training apparatus. For example, the user information relating to the operation count information may represent the total operation count obtained by summing together operation counts represented by sets of operation count information that are stored and assigned to the user (that is, the sum of operation counts that have been assigned to the user since the assignment of the first set of operation count information until the expiration of the valid period thereof for a certain period) or may represent the number of sets of operation count information that are stored and assigned to the user (that is, the number of times operation count information is assigned to the user since the assignment of the first set of operation count information until the expiration of the valid period thereof for a certain period). Even when such information is included in the candidate user image, it is possible to make it easier for the player to select a user to be given the reward, as in the present embodiment.

As shown in FIG. 12, the user selection image includes a friend image 305. The friend image 305 represents an instruction to send the obtained operation count information to a friend of a user as a gift. Herein, the term "a friend of a user" refers to a user who is registered as a friend of one of users who are registered with the game application of the main body apparatus 2 (specifically, the users corresponding to the candidate user images 302 to 304, who will hereinafter be referred to as "locally-registered users"). This friend user is a user who is registered with another main body apparatus different from the main body apparatus 2, for example. Note however that in the present embodiment, a locally-registered user may also be registered as a friend. For example, a user corresponding to the candidate user image 304 may be registered as a friend of the user corresponding to the candidate user image 302. Thus, a friend user may be a user who plays the game using the game system 1 (i.e., a locally-registered user) or may be a user who plays the game using another game system different from the game system 1.

When an input of selecting the friend image 305 is detected on the user selection image, the main body apparatus 2 proceeds to the process of identifying, as a user to be given a reward, a user who is registered as a friend of a locally-registered user. Although the details will be described later, in this case, as the locally-registered user sends a gift to the friend user, the friend user is given a reward.

In such a case, the main body apparatus 2 first accepts an input of selecting one user to be the gift sender from among locally-registered users. As described above, in the present embodiment, there may be a plurality of locally-registered users for the single game system 1. In such a case, the player who started the game application and the user who is the sender may not coincide with each other. Therefore, in the present embodiment, at the time of identifying a user who is the sender, the game system 1 presents locally-registered users as candidates.

For example, the main body apparatus 2 displays images representing locally-registered users on the display and accepts an input of selecting one of the images. Note that these images may be similar to the candidate user images on the user selection image described above. When such an input is detected, the main body apparatus 2 identifies, as the user who is the sender of the gift, the locally-registered user represented by the selected image.

Next, the main body apparatus 2 accepts an input of selecting a user to be the receiver of the gift from among friends of the user who is the sender of the gift. For example, the main body apparatus 2 displays candidate friend images representing the friends of the user who is the sender of the gift on the display and accepts an input of selecting one of the images. Note that the main body apparatus 2 stores information of friends of each locally-registered user. For example, for each friend user, the main body apparatus 2 stores the name of the friend user, and if the friend user is registered with the game application, also stores information representing the registration. Note that in addition to this information, the main body apparatus 2 may also store information relating to the progress of the game for the friend user. Information of friends of each locally-registered user is stored in a server to be described below, and the main body apparatus 2 may obtain information of friends from the server.

Note that in the present embodiment, the main body apparatus 2 displays candidate friend images for those of the friends of the user who is the sender of the gift that are registered with the game application. On the other hand, in other embodiments, the main body apparatus 2 may display candidate friend images also for those of the friends of the user who is the sender of the gift that are not registered with the game application. A candidate friend image may include the name of a friend user and may also include information relating to the progress of the game.

When an input of selecting a candidate friend image is detected, the main body apparatus 2 identifies, as the user to be the receiver of the gift, a friend represented by the selected image. Herein, the game system 1 (specifically, the main body apparatus 2) is communicably connected to the server of the game application via a network. In such a case, the main body apparatus 2 sends the operation count information obtained from the training apparatus and information representing the user to be the receiver of the gift to the server. The server receives these information, and stores the operation count information in association with the user who is the receiver. This means that the obtained operation count information is assigned to the user who is the receiver of the gift (that is, the operation count information is given to the user who is the receiver as a gift), and that the user to be given the reward has been identified.

In the user specifying process, when operation count information is assigned to a user (specifically, a locally-registered user or a friend of a locally-registered user), the main body apparatus 2 resets the operation count information stored in the training apparatus. That is, the main body apparatus 2 transmits, to the training apparatus, an instruction to delete the operation count information stored in the training apparatus. In response to this instruction, the training apparatus deletes the operation count information.

As described above, in the present embodiment, the game system 1 identifies a user different from the player (i.e., a friend user) based on an instruction from the player, and gives the identified user a gift based on the operation count information obtained from the training apparatus. Then, the user can perform a fitness exercise operation using the training apparatus during the non-game period not only for the purpose of obtaining a reward himself/herself, but also for the purpose of sending a gift to a friend. Thus, it is possible to give the user a wider variety of motivations to perform fitness exercise operations using the training apparatus. According to the description above, it is possible to motivate not only a user who enjoys obtaining a reward himself/herself, but also a user who enjoys sending gifts to friends, to perform fitness exercise operations. Thus, it is possible to motivate a wider variety of users.

Note that a "gift based on operation count information" is not limited to the operation count information itself, but may be of any content that is determined based on the operation count information. For example, a gift based on operation count information may be operation count information that has been subjected to a predetermined correction (e.g., a correction of reducing the operation count represented by the operation count information) or may be information representing content of a reward that is determined based on the operation count information.

Note that in the present embodiment, the game system 1 sets an upper limit to the number of times a user can send a gift to one friend for a unit period. Specifically, in the game system 1, the number of times a user can send a gift to one friend for a unit period (herein, 1 day) is one. Then, it is possible to reduce the possibility that the playability of the game may lower for a friend user as a result of receiving a lot of reward as gifts, and the difficulty level of the game becomes too low because of the reward.

Note that in other embodiments, there may be no upper limit to the number of times a user can send a gift to a friend. Note that in the present embodiment, there is an upper limit to the number of times the user himself/herself can be assigned the operation count information for a unit period (herein, once per day). Therefore, once the upper limit number of times is reached, there is no longer a motivation for the user to perform fitness exercise operations during the non-game period for the purpose of obtaining a reward for himself/herself. In contrast, when there is no upper limit to the number of times a gift can be sent to a friend, the user can perform fitness exercise operations during the non-game period for the purpose of sending gifts to friends even after the above upper limit number of times is reached. Thus, even after the above upper limit number of times is reached, it is possible to motivate the user to perform fitness exercise operations during the non-game period.

[2-2-2. Story Mode Process]

When a user to be given a reward is identified as described above, the game system 1 ends the user specifying process. In the present embodiment, when the user specifying process ends, the game system 1 displays the menu image again. Then, when an input of selecting an image that instructs to start the predetermined game mode (i.e., the story mode) is detected on the menu image, the main body apparatus 2 starts the story mode process of executing the story mode. Note that in the present embodiment, as the predetermined game mode in the game application, a story mode is executed wherein the game progresses in the form of a role playing game. Note however that the game in the predetermined game mode may be of any content. For example, the game in the predetermined game mode may be any game wherein the user can save the save data. The game application may include a plurality of game modes. In the present embodiment, a reward is given after the start of the story mode process and before the start of the game in the story mode.

When the story mode process is started, first, the game system 1 accepts an input of selecting a user to be the player who plays the game in the story mode, from among users registered with the game application, and identifies the selected player. At this point, the game system 1 recognizes the user (i.e., the player) who is using the game application, from among the locally-registered users. Next, the game system 1 gives a reward to the player (step S6).

In the present embodiment, when a reward is given to the player, the game system 1 displays a reward giving image on the display. FIG. 13 is a diagram showing an example of a reward giving image. The reward giving image is an image that represents the content of the reward to be given to the player. The reward giving image shown in FIG. 13 indicates that four different rewards (experience points, money, materials and items) are given as rewards that have an influence on the progress of the game. Note that experience points are set for the player character controlled by the player, and the reward giving image shows the amount by which the experience points of the player character are increased as a reward. Money is owned by the player character in the game, and the reward giving image shows the amount of money given to the player character as a reward. Materials are used to create items in the game, and the reward giving image shows the type and the amount of material given to the player character as a reward. Items are used by the player character in the game. Specifically, an item may give an influence on the progress of the game by influencing the ability and the state of an object appearing in the game, e.g., changing the parameters of the player character or an enemy character. Moreover, an item may give an influence on the progress of the game by influencing the game space, e.g., changing enemy characters or materials arranged in the game space. The reward giving image shows the type and the amount of item given to the player character as a reward.

As described above, "a reward that has an influence on the progress of the game" is a reward in the game, which may be the effect of making it more advantageous for the player to progress through the game or an item that has such an effect. In other embodiments, a reward that has an influence on the progress of the game may be additional content such as an additional character or an additional stage that can be added to the game. Thus, "a reward that has an influence on the progress of the game" may be game content that has an influence on the gameplay by the player, e.g., experience points, money, materials, items, additional characters and additional content. Note that the reward to be given may include those that have no influence on the progress of the game (e.g., an item that only changes the appearance of the player character), in addition to those that have an influence on the progress of the game.

In the present embodiment, the content of the reward to be given to the player is determined based on the operation count information assigned to the player. FIG. 14 is a diagram showing an example of the relationship between the operation count represented by the operation count information and the content of the reward to be given. In the present embodiment, as shown in FIG. 14, the variety and/or the amount of the reward to be given are increased each time the operation count reaches a round number or the upper limit number. Specifically, when the operation count reaches 100, money and one material are added to the reward as compared with a case where the operation count is 99 or less. When the operation count reaches 200, two materials are added to the reward as compared with a case where the operation count is 199 or less. Similarly, the variety and/or the amount of the reward to be given are increased when the operation count reaches 300, 400, and 500.

The game system 1 stores table information representing the relationship between the operation count and the content of the reward as shown in FIG. 14. For example, the table information may be included in the program of the game application. With reference to the table information, the game system 1 determines the content of the reward based on the operation count information. Note that the game system 1 deletes operation count information that has been used to determine a reward to be given.

Note that for the experience points and money, the game system 1 determines the amount of experience points and the amount of money in accordance with the operation count, irrespective of whether the operation count has reached a round number or the upper limit number. For example, the amount of experience points and the amount of money to be given as the reward may each be a value that is obtained by multiplying the operation count by a predetermined coefficient.

For materials and items, as shown in FIG. 14, the number of materials and the number of items to be given are determined based on the operation count. On the other hand, types of materials and types of items to be given are determined based on the progress of the game for the player. In the present embodiment, of the materials and the items appearing in the game, those that the player character has obtained before are given as the reward. For example, using probability parameters, the game system 1 selects one or more of the materials or the items that the player character has obtained before. Thus, in the present embodiment, materials and items to be given are selected on the condition that the player character has obtained them before. Therefore, it is possible to prevent the difficulty level of the game from becoming too low because of the reward.

As described above, in the present embodiment, when the obtained operation count information indicates that a larger load has been applied to the training apparatus (specifically, when the operation count is high), the game system 1 gives the player a reward (e.g., a larger amount of reward) that makes it more advantageous for the player to progress through the game as compared with a case where the operation count information indicates that a smaller load has been applied to the training apparatus (specifically, when the operation count is low). Then, it is possible to motivate the player to perform more fitness exercise operations using the training apparatus.

In the present embodiment, the game system 1 includes a notifier (specifically, the vibrator 117) configured to notify the user that the operation count represented by the operation count information has reached a predetermined number (specifically, a round number or the upper limit number) while the game is not being executed. The game system 1 increases the amount of reward to be given for operation count information representing an operation count that is greater than or equal to a predetermined number as compared with the amount of reward to be given for operation count information representing an operation count that is less than the predetermined number. The game system 1 gives a different type of reward for operation count information representing an operation count that is greater than or equal to a predetermined number as compared with the reward to be given for operation count information representing an operation count that is less than the predetermined number. According to the description above, when the player performs a fitness exercise operation using the training apparatus during the non-game period, the player may often perform the fitness exercise operation aiming at a round number. Herein, in the present embodiment, the game system 1 can notify the player that the operation count has reached a round number, thereby improving the convenience of the player, who is performing the fitness exercise operation until a round number is reached. It is possible to motivate the player to perform the fitness exercise operation until a round number is reached.

Note that although the notifier gives a notification by way of a sound and a vibration in the present embodiment, there is no limitation on the manner of notification. For example, in other embodiments, the notifier may give a notification by way of light.

In the present embodiment, in a case where a plurality of sets of operation count information are assigned to the player, the game system 1 determines the reward based on each set of operation count information (that is, each set of operation count information assigned for one unit period). That is, the reward to be given is not determined in accordance with the total sum of the operation counts represented by the sets of operation count information, but is determined in accordance with the operation count represented by each set of operation count information. Note that rewards thus determined may be collectively given to the player at once.

If the content of the reward were to be determined based on the total sum of the operation counts of the sets of operation count information, an excessive amount of reward might be given to the user by summing together the operation counts even if the user performs only a little bit of a fitness exercise operation during the non-game period for each unit period. Then, the user may possibly no longer perform a lot of a fitness exercise operation during the non-game period for one unit period, thereby failing to make the user preform an adequate amount of a fitness exercise operation. In contrast, in the present embodiment, the game system 1 determines the content of the reward based on the operation count information that is assigned for one unit period, and it is therefore possible to motivate the user to perform an adequate amount of a fitness exercise operation during the non-game period for one unit period.

As described above, a reward based on the operation count information assigned to the player is given to the player. Next, the game system 1 gives the player a reward based on a gift sent to the player. That is, in the present embodiment, the game system 1 converts a gift that is sent to the player from another user to a reward. First, the game system 1 accesses the server and inquires the server whether there is a gift that is sent to the player. Specifically, the game system 1 transmits, to the server, inquiry information that includes identification information of the player (e.g., the ID of the account of the player). When inquiry information from the game system 1 is received, the server checks if there is a gift for the player based on the identification information included in the inquiry information. As described above, the server stores operation count information, which is a gift, in association with the user who is the receiver of the gift. Therefore, the server can determine whether there is a gift for the user based on whether there is operation count information stored in association with the user represented by the identification information. When there is a gift for the player, the server transmits the operation count information stored in association with the player to the game system 1. Note that when a plurality of sets of operation count information are stored in association with the player, the server transmits the plurality of sets of operation count information to the game system 1. The server deletes, in the server, the sets of operation count information that have been transmitted. On the other hand, when there is no gift for the player, the server transmits information indicating that there is no gift to the game system 1.

When the operation count information is received from the server, the game system 1 determines the content of the reward based on the received operation count information, and gives the reward to the player. In the present embodiment, even for a reward based on operation count information, which is a gift, the game system 1 determines the content of the reward based on the table information described above, as with a reward based on operation count information obtained from the training apparatus. The game system 1 displays an image representing the content of the reward given on the display, similar to the reward giving image shown in FIG. 13. This image may include the name of the user who is the sender of the gift.

As described above, in the present embodiment, the game system 1 gives the user, who is assigned a gift (i.e., operation count information), a reward based on the gift. Then, the user who receives the gift can more advantageously progress through the game with the reward, and it is therefore possible, with the gift, to motivate the user to play the game. In the present embodiment, with the gift, it is possible to motivate both the user who sends a gift and the user who receives the gift to play the game.

Note that in other embodiments, the game system 1 may vary the content of the reward between a reward that is given based on operation count information obtained from the training apparatus included therein and a reward that is given based on a gift. In other embodiments, the reward obtained based on a gift may be a reward that has no influence on the progress of the game, or a gift itself may be a reward that has no influence on the progress of the game.

In the present embodiment, when a reward is given based on operation count information, which is a gift, the game system 1 makes a correction such that the operation count represented by the operation count information is decreased. Then, the game system 1 determines the content of the reward based on the corrected operation count and the table information. Note that there is no limitation on the specific method for correction. For example, the game system 1 may make a correction such that the operation count represented by the operation count information is multiplied by a predetermined coefficient (e.g., 80%).

In the present embodiment, one user may possibly be sent gifts from a plurality of users. In such a case, there may be too much reward for the gifts, and the difficulty level of the game may possibly become too low because of the excessive reward, thus lowering the playability of the game. This may lower the motivation for the user to play the game. For this reason, in the present embodiment, the operation count represented by operation count information, which is a gift, is corrected, so as to reduce the possibility that the difficulty level of the game may become too low because of the excessive reward. In other embodiments, the game system 1 may correct the operation count represented by the operation count information so that the count is less than or equal to an upper limit value. Then, as in the present embodiment, it is possible to reduce the possibility that the difficulty level of the game may become too low because of the excessive reward.

Note that when there are a plurality of sets of operation count information, which are gifts for the player, the game system 1 iterates the process of determining the reward based on one set of operation count information for a number of times equal to the number of sets of operation count information. In other embodiments, when there are a plurality of sets of operation count information, which are gifts, the game system 1 may sum together the operation counts represented by the plurality of sets of operation count information (where the sum is corrected to be less than or equal to the upper limit number), and determine the reward based on the total count. This also can reduce the possibility that the difficulty level of the game may become too low because of the excessive reward.

In other embodiments, the game system 1 may determine the content of the reward based on operation count information, which is a gift, by using second table information, which is different from first table information that is used to determine the reward based on operation count information obtained from the training apparatus. Then, by setting the second table information so that the reward determined using the second table information is less than the reward determined using the first table information, it is possible to reduce the possibility that the reward for a gift may become excessive.

Note that when the player is given a reward based on operation count information, which is a gift, the game system 1 may encourage the player to send a return gift, after giving the reward to the player. For example, the game system 1 may display a message such as "Return a gift?" on the display, or may display, on the display, a message that encourages the player to specify the reward giving icon on the menu image.

Figure 15:
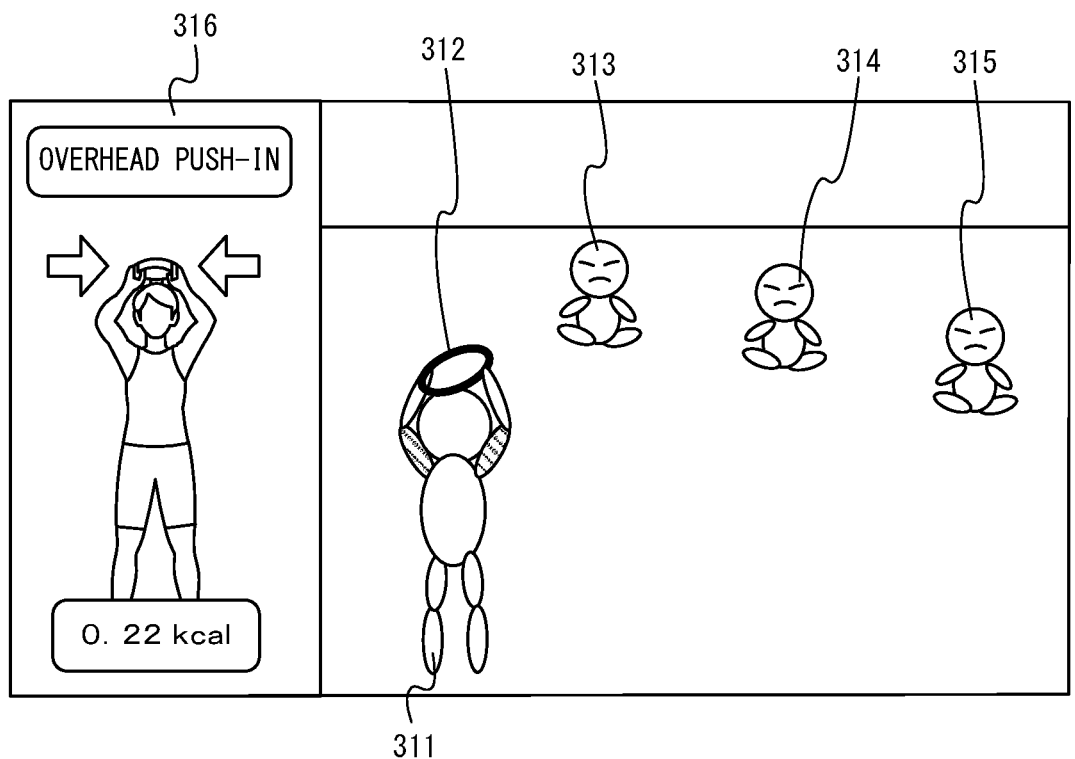
FIG. 15 is a diagram showing an example of a game image displayed during a game.

After the player is given the reward, the game system 1 starts the game in the story mode. FIG. 15 is a diagram showing an example of the game image displayed during the game. The game image shown in FIG. 15 includes an image representing the game space including therein a player character 311 having an object 312, which resembles the training apparatus, and enemy characters 313 to 315. The game image also includes an image 316 representing a fitness exercise operation that the player should perform in the game. In the present embodiment, the game is executed, wherein the player character 311 battles the enemy characters 313 to 315. In this game, in accordance with the fitness exercise operation performed by the user using the training apparatus, the game system 1 controls the player character 311 to attack the enemy characters 313 to 315 or defend an attack from the enemy characters 313 to 315. Note that there is no limitation on the content of the game using the training apparatus, and the game may be of any genre.

Note that the player can more advantageously progress through the game with the reward given to the player. Specifically, as the experience points and the money of the player character are increased, the player can more advantageously progress through the game. The player character can use various advantageous effects in the game by using items given to the player. For example, the player character can use an item to strengthen the player character or weaken the enemy characters. The player character can also use an item to reduce the enemy characters arranged in the game space or to increase the items lying in the game space. The player character can also create such items in the game using materials given to the player.

During the game, the training apparatus transmits operation data including ring operation data and controller operation data (step S7). The ring operation data is data in accordance with an operation performed on the ring-shaped extension apparatus 5, and includes information representing the strain value. The controller operation data is data in accordance with an operation performed on the right controller 4, and includes information representing an operation performed on the input section of the right controller 4 (specifically, the buttons 113, the analog stick 52 and the sensors 114 and 115).

The main body apparatus 2 receives the operation data from the training apparatus, and executes the game in the story mode based on the operation data (step S8). Since such operation data is obtained from the training apparatus during the game, the main body apparatus 2 can calculate various information relating to operations performed on the training apparatus, as well as the operation count. For example, the main body apparatus 2 can calculate the amount of deformation and the direction of deformation of the ring-shaped extension apparatus 5 based on information representing the strain value included in the ring operation data, and can also calculate the movement or the attitude of the training apparatus based on information representing the detection results from the acceleration sensor 114 and/or the angular velocity sensor 115 included in the controller operation data.

Note that during the game, the training apparatus operates in the main body operation mode, and does not perform the process of keeping the operation count as in the independent operation mode. In the main body operation mode, the training apparatus does not keep the operation count and does not store the operation count.

As described above, in the present embodiment, while the game is executed, the training apparatus transmits the first information based on information detected by a sensor (specifically, the strain value) to the main body apparatus 2. While the game is not executed, the training apparatus stores, in a storage device (e.g., the memory provided in the control section 213), the second information (specifically, operation count information representing the number of times the operation of applying a load on the training apparatus has been performed) that is different from the first information and that is calculated from the first information. Note that "the first information based on information detected by a sensor" may be the information itself detected by the sensor (the strain value in the embodiment described above), or may be information that is calculated from the information detected by the sensor (e.g., the amount of deformation calculated from the strain value).

According to the description above, while the game is not executed, the second information, which is calculated from the first information, is stored, as information to be used in the process to be later performed on the main body apparatus 2 so that it is possible to reduce the process load on the main body apparatus 2. While the game is executed, the first information is transmitted so that the main body apparatus 2 can calculate a wider variety of information.

3. Specific Example of Information Process of Game System

Figure 16:
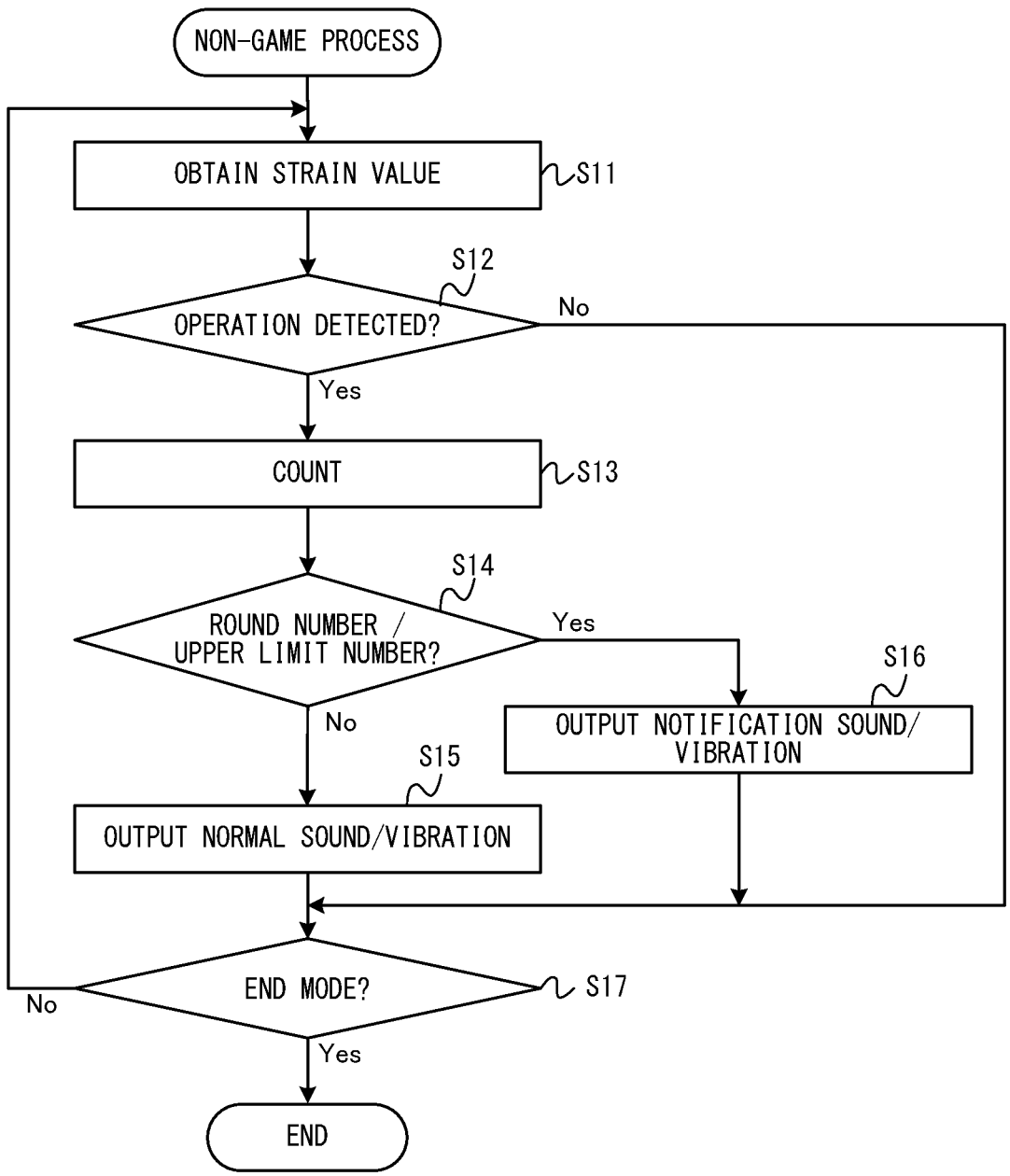
FIG. 16 is a flow chart showing an example of a non-game process executed by a non-limiting training apparatus.

Next, detailed examples of processes executed on the game system 1 will be described. FIG. 16 is a flow chart showing an example of a non-game process executed by the training apparatus. The non-game process is a process that is executed when counting and storing the number of operations performed on the training apparatus during the non-game period, and is a process that is executed when the training apparatus operates in the independent operation mode described above. The series of non-game processes shown in FIG. 16 is started in response to the start of the independent operation mode.

Note that in the present embodiment, it is assumed that the processor of the control section 213 of the ring-shaped extension apparatus 5 executes a program stored in the memory of the control section 213 to execute the processes of the steps shown in FIG. 16. Note however that in other embodiments, some of the processes of the steps may be executed by another processor (e.g., a dedicated circuit, etc.) different from the processor of the control section 213, or may be executed by a processor of the right controller 4 (e.g., the communication control section 111). The processes of the steps shown in FIG. 16 are merely illustrative, and the order of steps to be performed may be switched around or other processes may be executed in addition to (or instead of) the processes of the steps, as long as similar results are obtained.

The control section 213 executes the processes of the steps shown in FIG. 16 by using the memory. That is, the control section 213 stores information (in other words, data) obtained in each process step in the memory and reads out the information from the memory to use the information in a subsequent process step.

When the non-game process is started, first in step S11, the processor obtains the strain value detected by the strain detector 211. The process of step S12 is executed following step S11.

In step S12, the processor determines whether or not a push-in operation or a pull operation on the ring-shaped extension apparatus 5 has been detected. Note that the detection of a push-in operation or a pull operation is performed in accordance with the method described in "[2-1. Process during non-game period]" above based on the strain value obtained in step S11. When the determination result from step S12 is affirmative, the process of step S13 is executed. On the other hand, when the determination result from step S12 is negative, the process of step S17 to be described below is executed, skipping the processes of steps S13 to S16.

In step S13, the processor keeps the count of operations that have been performed on the ring-shaped extension apparatus 5. Specifically, the processor updates the value stored in the memory as the operation count information by incrementing the value. The process of step S14 is executed following step S13.

In step S14, the processor determines whether the operation count incremented in step S13 has reached a round number or the upper limit number. When the determination result from step S14 is negative, the process of step S15 is executed. On the other hand, when the determination result from step S14 is affirmative, the process of step S16 is executed.

In step S15, the processor outputs a normal sound and a normal vibration. Specifically, the processor generates a command for outputting a predetermined sound and a predetermined vibration, and transmits the command to the right controller 4 via the terminal 214. The right controller 4, having received the command, causes the vibrator 117 to output a sound and a vibration as specified by the command. Note that the sound and the vibration of step S15 are referred to as "a normal sound and a normal vibration" so as to distinguish them from "a notification sound and a notification vibration" of step S16 to be described below. The process of step S17 is executed following step S15.

On the other hand, in step S16, the processor outputs a notification sound and a notification vibration for notifying the player of a round number or the upper limit number. Herein, a notification sound and a notification vibration are output in a different manner than a sound and a vibration are output in step S15. Moreover, a notification sound and a notification vibration for notifying the player of a round number are output in a different manner than a notification sound and a notification vibration for notifying the player of the upper limit number are output. Thus, the player can know whether the operation count has reached a round number, has reached the upper limit number, or has reached neither. The process of step S17 is executed following step S16.

In step S17, the processor determines whether or not to end the independent operation mode. Specifically, the processor determines whether the end operation has been performed. When the determination result from step S17 is affirmative, the processor ends the non-game process. On the other hand, when the determination result from step S17 is negative, the process of step S11 is executed again. Thereafter, the processor repeatedly executes the process loop of steps S11 to S17 until the determination result of step S17 is affirmative. Note that the process loop of steps S11 to S17 is repeatedly executed at the rate of once per a predetermined amount of time.

Figure 17:
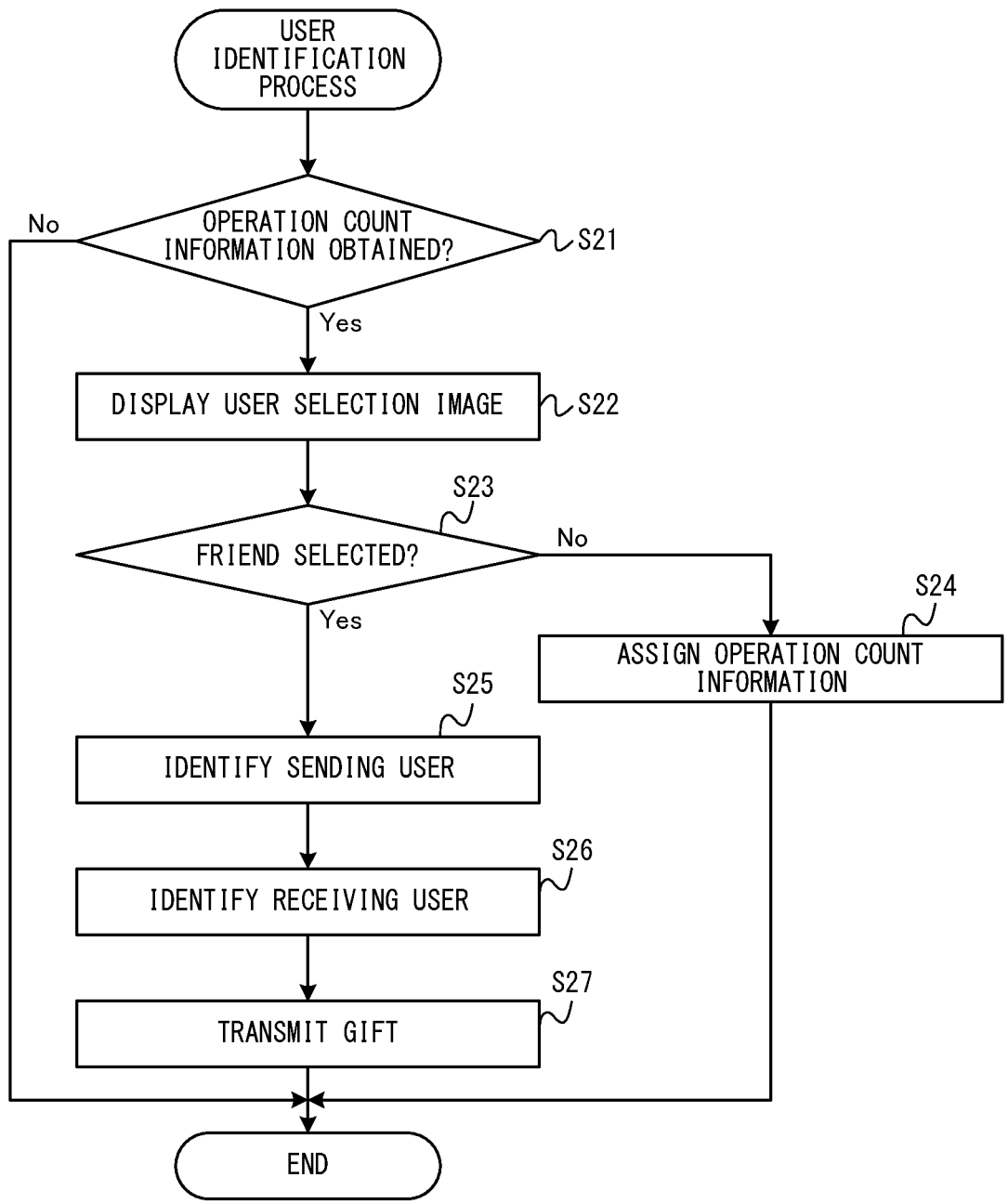
FIG. 17 is a flow chart showing an example of a user specifying process executed by a non-limiting main body apparatus 2.

FIG. 17 is a flow chart showing an example of the user specifying process executed by the main body apparatus 2. The series of user specifying processes shown in FIG. 17 is started in response to detection of an input of specifying the reward giving icon on the menu image.

Note that the present embodiment, it is assumed that the processor 81 of the main body apparatus 2 executes the program of the game application stored in the game system 1 to execute the processes of the steps shown in FIG. 17 and FIG. 18 to be discussed below. Note however that in other embodiments, some of the processes of the steps may be executed by another processor (e.g., a dedicated circuit, etc.) different from the processor 81. When the game system 1 is capable of communicating with another information processing apparatus (e.g., a server), some of the processes of the steps shown in FIG. 17 and FIG. 18 may be executed on the other information processing apparatus. For example, some of the processes for detecting an input by the player based on the operation data from the training apparatus may be executed by the training apparatus. The processes of the steps shown in FIG. 17 and FIG. 18 are merely illustrative, and the order of steps to be performed may be switched around or other processes may be executed in addition to (or instead of) the processes of the steps, as long as similar results are obtained.

Figure 18:
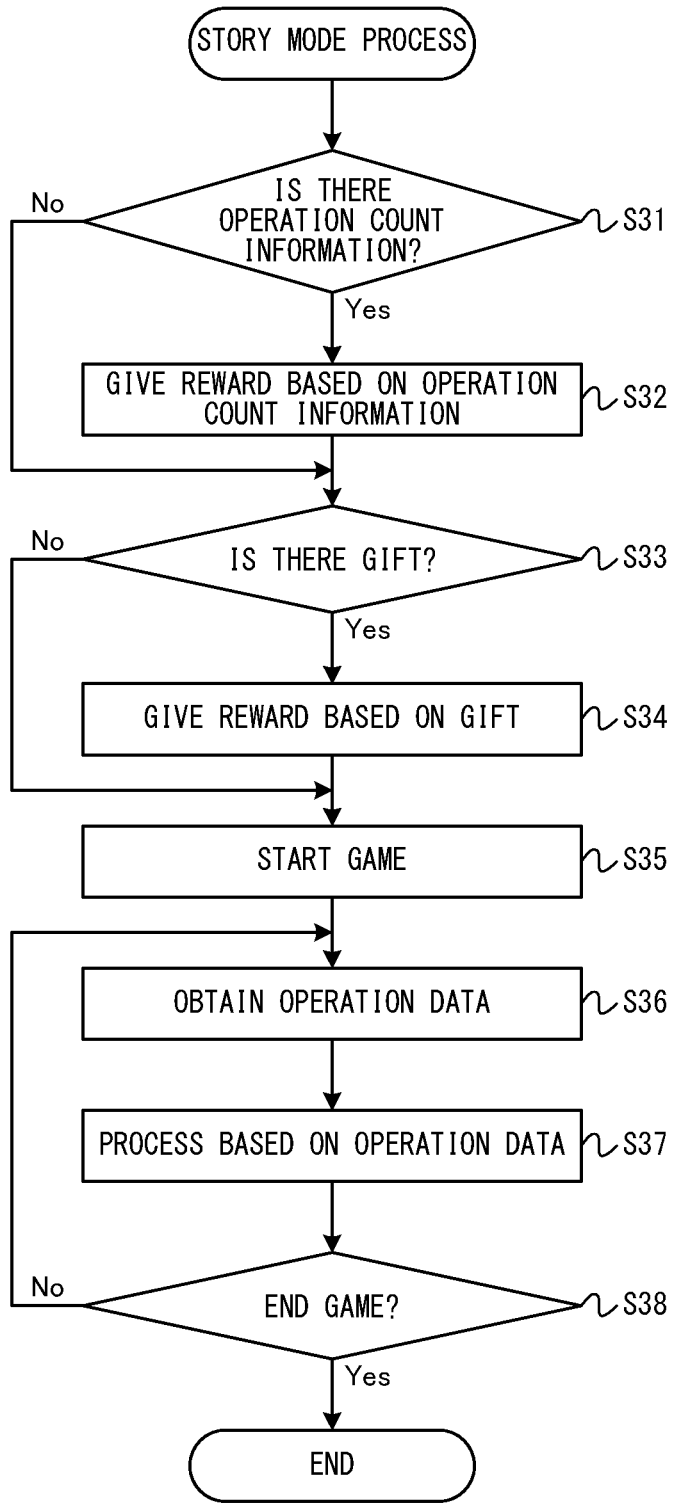
FIG. 18 is a flow chart showing an example of a story mode process executed by the non-limiting main body apparatus 2.

The processor 81 executes the processes of the steps shown in FIG. 17 and FIG. 18 by using a memory (e.g., the DRAM 85). That is, the processor 81 stores information (in other words, data) obtained in each process step in the memory and reads out the information from the memory to use the information in a subsequent process step.

Note that it is assumed that if there is operation count information that is assigned to a user registered with the game application of the main body apparatus 2 (that is, if there is operation count information for which a reward has not been given because after the operation count information was assigned to a user in a previous user specifying process, the user has not played the game) at the start of the user specifying process, the main body apparatus 2 has the operation count information associated with the user stored in the memory.

When the user specifying process is started, first in step S21, the processor 81 determines whether operation count information has been obtained from the training apparatus. As described above in the present embodiment, the main body apparatus 2 requests the training apparatus to transmit operation count information, and the training apparatus transmits the operation count information to the main body apparatus 2 in response to this request. By receiving the operation count information from the training apparatus, the processor 81 obtains the operation count information from the training apparatus. When no operation count information is stored in the training apparatus, the training apparatus transmits, in response to the request, information indicating that there is no operation count information to the main body apparatus 2. In such a case, the processor 81 determines that no operation count information has been obtained from the training apparatus. When the determination result from step S21 is affirmative, the process of step S22 is executed. On the other hand, when the determination result from step S21 is negative, the processor 81 ends the user specifying process.

In step S22, the processor 81 displays the user selection image on the display. Then, the processor 81 accepts an input of selecting one of candidate user images and a friend image included in the user selection image. Then, when this input is detected, the processor 81 executes the process of step S23.

In step S23, the processor 81 determines whether the friend image is selected on the user selection image. When the determination result from step S23 is negative (i.e., when a candidate user image is selected), the process of step S24 is executed. On the other hand, when the determination result from step S23 is affirmative, the process of step S24 is executed.

In step S24, the processor 81 assigns the operation count information to the selected user. Specifically, the processor 81 stores the operation count information obtained in step S21 in the memory in association with the selected user. Note that as described in "[2-2-1. User specifying process]" above, when the number of times the operation count information is assigned for a unit period has reached the upper limit for the selected user, the processor 81 ends the process of step S24 without assigning the operation count information to the user. As described in "[2-2-1. User specifying process]" above, where the number of sets of operation count information assigned to one user is equal to the upper limit, if further operation count information is assigned to that user, the processor 81 deletes the oldest set of operation count information stored in the memory and stores the newly assigned operation count information in the memory. After the end of step S24, the processor 81 ends the user specifying process.

On the other hand, in step S25, the processor 81 identifies the user who is the sender of the gift (in other words, the operation count information). Note that the identification of the user who is the sender is done by the process described in "[2-2-1. User specifying process]" above. The process of step S26 is executed following step S25.

In step S26, the processor 81 identifies the user who is the receiver of the gift. Note that the identification of the user who is the receiver is done by the process described in "[2-2-1. User specifying process]" above. The process of step S27 is executed following step S26.

In step S27, the processor 81 transmits the gift to the server. Specifically, the processor 81 transmits the operation count information obtained in step S21 and information representing the user who is the receiver of the gift to the server. After the end of step S27, the processor 81 ends the user specifying process.

FIG. 18 is a flow chart showing an example of the story mode process executed by the main body apparatus 2. The series of story mode processes shown in FIG. 18 is started in response to detection of an input of specifying the game mode icon on the menu image.

When the user specifying process is started, first in step S31, the processor 81 determines whether there is operation count information assigned to the player. When the determination result from step S31 is affirmative, the process of step S32 is executed. On the other hand, when the determination result from step S31 is negative, the process of step S33 is executed, skipping the process of step S32.

In step S32, the processor 81 gives a reward to the player based on the operation count information assigned to the player. Specifically, the processor determines the content of the reward in accordance with the method described in "[2-2-2. Story mode process]" above, and gives the determined reward to the player. Herein, the main body apparatus 2 stores save data of the game for each locally-registered user. The processor updates the save data for the player so that the save data reflects the reward given to the player. The process of step S33 is executed following step S32.

In step S33, the processor 81 determines whether there is a gift sent to the player. Specifically, as described in "[2-2-2. Story mode process]" above, the processor 81 accesses the server and inquires the server whether there is a gift that is sent to the player. In response to the inquiry, the server transmits the operation count information stored in association with the player or information indicating that there is no gift for the player to the main body apparatus 2. Therefore, based on the information received from the server, the processor 81 can determine whether there is a gift that is sent to the player. When the determination result from step S33 is affirmative, the process of step S34 is executed. On the other hand, when the determination result from step S33 is negative, the process of step S35 is executed, skipping the process of step S34.

In step S34, the processor 81 gives a reward to the player based on the gift that is sent to the player. Specifically, the processor determines the content of the reward in accordance with the method described in "[2-2-2. Story mode process]" above, and gives the determined reward to the player. As in step S32, the processor updates the save data for the player so that the save data reflects the reward given to the player. The process of step S35 is executed following step S34.

In step S35, the processor 81 executes the process for starting the game in the story mode. For example, the processor 81 determines the game circumstance at the time of resumption of the game based on the save data for the player. Therefore, the game is resumed while reflecting the reward given through the processes of steps S32 and S34. The process of step S36 is executed following step S35.

In step S36, the processor 81 obtains operation data from the training apparatus via the controller communication section 83. The process of step S37 is executed following step S36.

In step S37, the processor 81 executes the process of progressing the game based on the operation data obtained in step S36. For example, the processor 81 progresses the game by causing the player character to act based on the operation data or by executing a process in accordance with an instruction from the player indicated by the operation data. The processor 81 displays the game image representing the game circumstance on the display. The process of step S38 is executed following step S37.

In step S38, the processor 81 determines whether or not to end the game. For example, when an instruction to end the game is given by the player, the processor 81 determines to end the game. When the determination result from step S38 is affirmative, the processor ends the story mode process. On the other hand, when the determination result from step S38 is negative, the process of step S36 is executed again. Thereafter, the processor repeatedly executes the process loop of steps S36 to S38 until the determination result of step S38 is affirmative.

4. Functions/Effects and Variations of Present Embodiment

In the embodiment described above, an information processing system (e.g., the game system 1) includes the training apparatus and an information processing apparatus (e.g., the main body apparatus 2). The information processing apparatus includes a game processor (e.g., the processor 81) configured to execute the game. The training apparatus includes a sensor (e.g., the strain detector 211) and the control section 213. The sensor detects the load applied on the training apparatus. The control section 213 is configured to transmit information relating to the load detected by the sensor (e.g., the operation count information) as the first information to the information processing apparatus while the game is executed by the game processor. The control section 213 is configured to store information relating to the load detected by the sensor (e.g., the strain value) as the second information in a storage device (e.g., the memory of the control section 213) that is integral with or separate from the training apparatus while the game is not executed by the game processor. The game processor progresses the game based on the first information received from the training apparatus, and gives the user of the game a reward that has an influence on the progress of the game based on the second information obtained from the storage device. Note that the first information and the second information may be the same information or different information.

According to the description above, a reward is given to the player in response to an operation performed on the training apparatus by the player while the game is not executed. Then, it is possible to motivate the player to perform training (e.g., the fitness exercise operation) using the training apparatus while the game is not executed. Moreover, since the reward to be given is a reward that has an influence on the progress of the game, it is also possible to motivate the player to play the game (that is, perform training using the training apparatus in the game) after using the training apparatus while the game is not executed.

The sensor is configured to detect a load applied on the training apparatus. There is no limitation on the specific type of the sensor, and there is no limitation on the specific physical quantity to be detected by the sensor as a load. In the present embodiment, since the strain detector 211 detects the strain value, the strain detector 211 can be said to be a sensor that detects a force applied on the training apparatus or a sensor that detects deformation of the training apparatus.

The "information relating to the load" may be any information relating to the load on the training apparatus, and may be information representing the maximum load on the training apparatus or may be information representing a value obtained by multiplying the operation count by the load, as well as the operation count information as used in the embodiment above (i.e., information representing the number of times a load is applied).

In the embodiment described above, the training apparatus stores the operation count information during a period in which the main body apparatus 2 is not operating. Herein, in other embodiments, the training apparatus may store the operation count information while the game is not executed during a period in which the main body apparatus 2 is operating. For example, the training apparatus may store the operation count information during a period in which the main body apparatus 2 executes an application different from the game application (an application in which the training apparatus is not used). As described above, "while the game is not executed by the game processor" may be a period in which the information processing apparatus is operating.

The phrase "configured to transmit information (relating to the load detected by the sensor as the first information) to the information processing apparatus while the game is executed by the game processor" is not limited to the meaning that the first information is always transmitted to the information processing apparatus while the game is executed by the game processor. Herein, in the embodiment described above, the training apparatus stores the operation count information in the independent operation mode in which the training apparatus does not communicate with the main body apparatus 2. Therefore, if the training apparatus does not communicate with the main body apparatus 2 during a period in which the game application is executed by the main body apparatus 2, the training apparatus, which operates in the independent operation mode, stores the operation count information even during such a period. The training apparatus does not need to transmit the operation count information to the main body apparatus 2 even in such a state. The training apparatus is only required to have the function of transmitting the first information while the game is executed by the main body apparatus 2. In such a state, the training apparatus may store the operation count information therein instead of transmitting the operation count information (even during a period in which the game is executed by the main body apparatus 2). The training apparatus is only required to be able to store the operation count information while the game is not executed, and does not need to always store the operation count information while the game is not executed by the game processor. In such a state as described above, while the game is executed, the training apparatus may store the operation count information.

The embodiment described above is applicable to a game system or a game program, for example, with the aim of motivating the user to train using a training apparatus.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system including a training apparatus and an information processing apparatus, wherein:
   the information processing apparatus includes one or more processor configured to execute a game; and
   the training apparatus includes a sensor and one or more processor, wherein:
      the sensor is configured to detect a load applied on the training apparatus;
      the one or more processor of the training apparatus is configured to:
         transmit information relating to the load detected by the sensor as first information to the information processing apparatus while the game is executed by the information processing apparatus; and
         store information relating to the load detected by the sensor as second information in a storage device integral with or separate from the training apparatus while the game is not executed by the information processing apparatus; and
   the one or more processor of the information processing apparatus:
      progresses the game based on the first information received from the training apparatus; and
      gives a reward that has an influence on the progress of the game to a user of the game based on the second information obtained from the storage device.

2. The information processing system according to claim 1, wherein the one or more processor of the information processing apparatus gives the user a reward that makes it more advantageous for the user to progress through the game when the information obtained from the storage device represents a first load than when the information obtained from the storage device represents a second load smaller than the first load.

3. The information processing system according to claim 1, wherein:
   the one or more processor of the information processing apparatus displays, on a display, at least one of candidate user image relating to a candidate user who is to be given a reward, from among users who play the game using the information processing system, wherein the candidate user image represents a name of the candidate user and/or an image of a player character controlled by the candidate user;
   the candidate user image includes user information relating to a progress of the game for the candidate user and/or information relating to a load applied on the training apparatus by the candidate user; and
   the one or more processor of the information processing apparatus:
      identifies at least one user, from among the candidates represented by the candidate user image, as specified by a player; and
      gives the reward to the specified user.

4. The information processing system according to claim 1, wherein:
   the one or more processor of the information processing apparatus:
      identifies a user as specified by a player, wherein the identified user is different from the player performing an operation on the information processing system and plays the game using the information processing system or another information processing system different from said information processing system; and
      gives the identified user a gift based on the second information obtained from the storage device.

5. The information processing system according to claim 4, wherein the one or more processor of the information processing apparatus gives the reward based on the gift to a user who has been given the gift.

6. The information processing system according to claim 1, wherein:
   one or more processor of the training apparatus is configured to store operation count information as the second information in the storage device, wherein the operation count information represents the number of times an operation of applying a load on the training apparatus is performed, while the game is not executed by the information processing apparatus; and
   the one or more processor of the information processing apparatus:
      assigns the operation count information obtained from the storage device to a user, and gives a reward in accordance with the operation count information to the user who is assigned the operation count information; and
      sets an upper limit to at least one of the number of times operation count information is assigned to one user for a unit period and the total of the operation counts represented by the operation count information assigned to one user for the unit period.

7. The information processing system according to claim 6, wherein when first operation count information obtained during a first unit period and second operation count information obtained during a second unit period are assigned to one user, the one or more processor of the information processing apparatus gives a reward in accordance with the first operation count information and a reward in accordance with the second operation count information to the user.

8. The information processing system according to claim 6, wherein:
   the information processing system notifies the user that the operation count represented by the operation count information stored in the storage device has reached a predetermined number while the game is not executed by the information processing apparatus; and
   a reward to be given in accordance with operation count information representing the operation count that is greater than or equal to the predetermined number is more than a reward to be given in accordance with operation count information representing the operation count less than the predetermined number and/or is of a different type from a reward to be given in accordance with operation count information representing the operation count less than the predetermined number.

9. The information processing system according to claim 1, wherein one or more processor of the training apparatus is configured to:
   transmit information based on information detected by the sensor as the first information to the information processing apparatus while the game is executed by the information processing apparatus; and
   store information, that is different from the first information and is calculated from the first information, as the second information in the storage device while the game is not executed by the information processing apparatus.

10. The information processing system according to claim 9, wherein:
    the first information is detected by the sensor; and
    the second information is operation count information representing the number of times an operation of applying a load on the training apparatus is performed.

11. A non-transitory computer-readable storage medium storing an information processing program to be executed on one or more processor of an information processing apparatus capable of communicating with a training apparatus, wherein:
    the information processing program causes the one or more processor to execute a game;
    the training apparatus is configured to:
       detect a load applied on the training apparatus;
       transmit information relating to the detected load as first information to the information processing apparatus while the game is executed by the information processing apparatus; and
       store information relating to the detected load as second information in a storage device integral with or separate from the training apparatus while the game is not executed by the information processing apparatus; and
    the information processing program causes the one or more processor to execute:
       progressing the game based on the first information received from the training apparatus; and
       giving a reward that has an influence on the progress of the game to a user of the game based on the second information obtained from the storage device.

12. An information processing method to be executed on an information processing system including a training apparatus and an information processing apparatus, wherein:
    the information processing apparatus executes a game;
    the training apparatus:
       detects a load applied on the training apparatus;
       transmits information relating to the detected load as first information to the information processing apparatus while the game is executed by the information processing apparatus; and
       stores information relating to the load detected by the sensor as second information in a storage device integral with or separate from the training apparatus while the game is not executed by the information processing apparatus; and
    the information processing apparatus:
       progresses the game based on the first information received from the training apparatus; and
       gives a reward that has an influence on the progress of the game to a user of the game based on the second information obtained from the storage device.

* * * * *